(12) United States Patent
Dalli et al.

(10) Patent No.: US 11,295,199 B2
(45) Date of Patent: Apr. 5, 2022

(54) XAI AND XNN CONVERSION

(71) Applicant: UMNAI Limited, Ta' Xbiex (MT)

(72) Inventors: Angelo Dalli, Floriana (MT); Mauro Pirrone, Kalkara (MT)

(73) Assignee: UMNAI LIMITED, Ta'Xbiex (MT)

(*) Notice: Subject to any disclaimer, the term of this patent is extended or adjusted under 35 U.S.C. 154(b) by 0 days.

(21) Appl. No.: 17/114,995

(22) Filed: Dec. 8, 2020

(65) Prior Publication Data

US 2021/0174168 A1 Jun. 10, 2021

Related U.S. Application Data

(60) Provisional application No. 62/945,481, filed on Dec. 9, 2019.

(51) Int. Cl.
*G06N 3/04* (2006.01)
*G06N 3/08* (2006.01)
*G06N 3/10* (2006.01)

(52) U.S. Cl.
CPC ............. *G06N 3/0454* (2013.01); *G06N 3/08* (2013.01); *G06N 3/10* (2013.01)

(58) Field of Classification Search
CPC .......... G06N 3/0454; G06N 3/08; G06N 3/10
See application file for complete search history.

(56) References Cited

U.S. PATENT DOCUMENTS 9,728,184 B2 8/2017 Xue et al.
9,898,441 B2 2/2018 Narayanaswami et al.
10,515,306 B1* 12/2019 David ................. G06N 3/08
10,832,123 B2 11/2020 Sun et al.
2007/0150424 A1 6/2007 Igelnik
2018/0018553 A1* 1/2018 Bach .................. G06F 40/279
2019/0005384 A1* 1/2019 Sundar ................ G06N 3/04
2019/0228312 A1* 7/2019 Andoni ............... G06F 17/18
2019/0347553 A1* 11/2019 Lo ..................... G06N 3/082

(Continued)

FOREIGN PATENT DOCUMENTS

CN 109255429 A 1/2019

OTHER PUBLICATIONS

Barbado et al., "Rule Extraction in Unsupervised Anomaly Detection for Model Explainability: Application to OneClass SVM," in arXiv preprint arXiv: 1911.09315 (2019). (Year: 2019).*

(Continued)

*Primary Examiner* — Kamran Afshar
*Assistant Examiner* — Ryan C Vaughn
(74) *Attorney, Agent, or Firm* — Maier & Maier, PLLC

(57) ABSTRACT

In an exemplary embodiment, a method for extracting a model from an existing machine learning model may be shown and described. In black-box models, transfer learning consists of transferring knowledge with the objective of learning new patterns. However, in an exemplary embodiment, transfer learning presents the concept of converting an explainable neural network into logically equivalent variants, which may not be possible with black-box neural networks, which typically consist of multiple fully-connected layers. The white-box nature of an exemplary XNN or XAI enables new ways of transferring knowledge with intelligent conversions of neural networks in ways that are impossible to do with a black-box model.

29 Claims, 16 Drawing Sheets

High Level Induction Process

(56) References Cited

U.S. PATENT DOCUMENTS

2019/0354853 A1* 11/2019 Zoldi .................... G06N 5/045
2020/0401920 A1* 12/2020 Killoran ................ G06N 3/067

OTHER PUBLICATIONS

Han et al., "DSD: Dense-Sparse-Dense Training for Deep Neural Networks," in arXiv preprint arXiv:1607.04381 (2016). (Year: 2016).*

Wang et al., "Learning Performance Prediction via Convolutional GRU and Explainable Neural Networks in e-Learning Environments," in 101 Computing 587-604 (2019). (Year: 2019).*

Gunning, "Explainable Artificial Intelligence (XAI)," DARPA presentation (2017). (Year: 2017).*

Kisamori et al., "Model Bridging: To Interpretable Simulation Model from Neural Network," in arXiv preprint arXiv: 1906.09391 (2019). (Year: 2019).*

Vaughan et al., "Explainable Neural Networks based on Additive Index Models," in arXiv preprint arXiv: 1806.01933 (2018). (Year: 2018).*

Letham et al., "Interpretable Classifiers Using Rules and Bayesian Analysis: Building a Better Stroke Prediction Model," in 9.3 Annals of Applied Statistics 1350-71 (2015). (Year: 2015).*

Andrews et al., "Survey and Critique of Techniques for Extracting Rules from Trained Artificial Neural Networks," in 8.6 Knowledge-Based Systems 373-89 (1995). (Year: 1995).*

Robert Andrews et al., "Survey and critique of techniques for extracting rules from trained artificial neural networks", Elsevier Science B.V., Knowledge-Based Systems vol. 8 Number, Dec. 6, 1995, 17 pages From the Internet: https://doi.org/10.1016/0950-7051 (96)81920-4.

Gail A. Carpenter et al., "Rule Extraction: From Neural Architecture to Symbolic Representation", Feb. 2, 1994, 35 pages From the Internet: http://techlab.bu.edu/files/resources/articles_cns/CarpenterTan1995.pdf.

Min Lin et al., "Network In Network", arXiv:1312.4400v3 [cs.NE], Mar. 4, 2014, 10 pages From the Internet: https://arxiv.org/pdf/1312.4400.pdf.

* cited by examiner

Figure 1 - Interchangeable representation formats of the XAI rule-based model and XNN variants

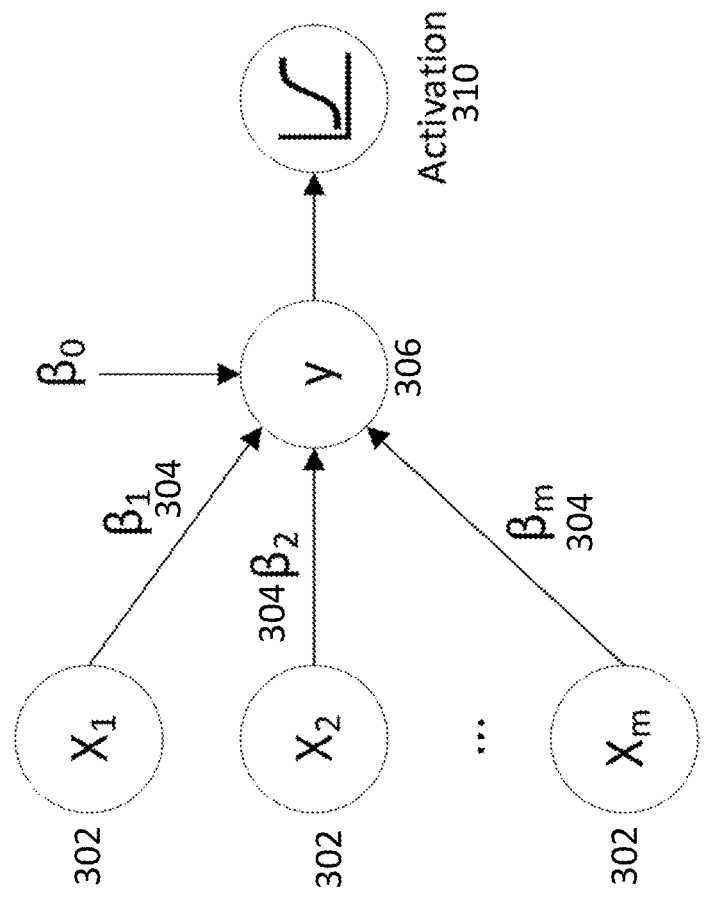
*Figure 3B – Logistic Function*
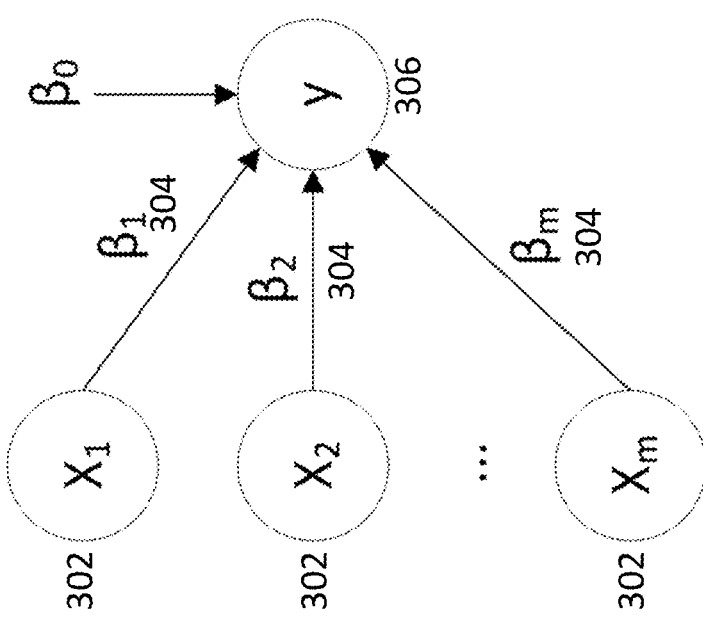
*Figure 3A – Linear Function*

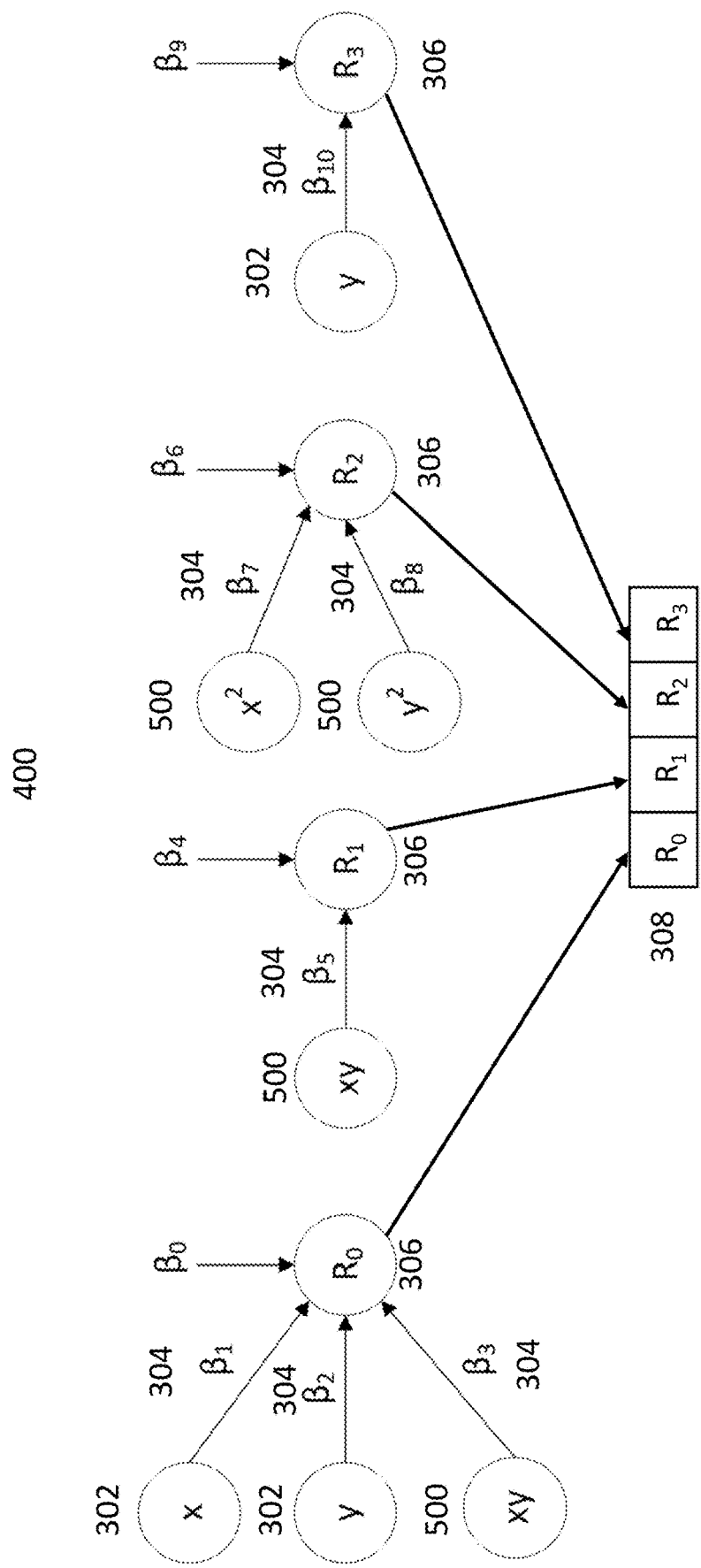
Figure 4 – Exemplary local linear models for an XNN

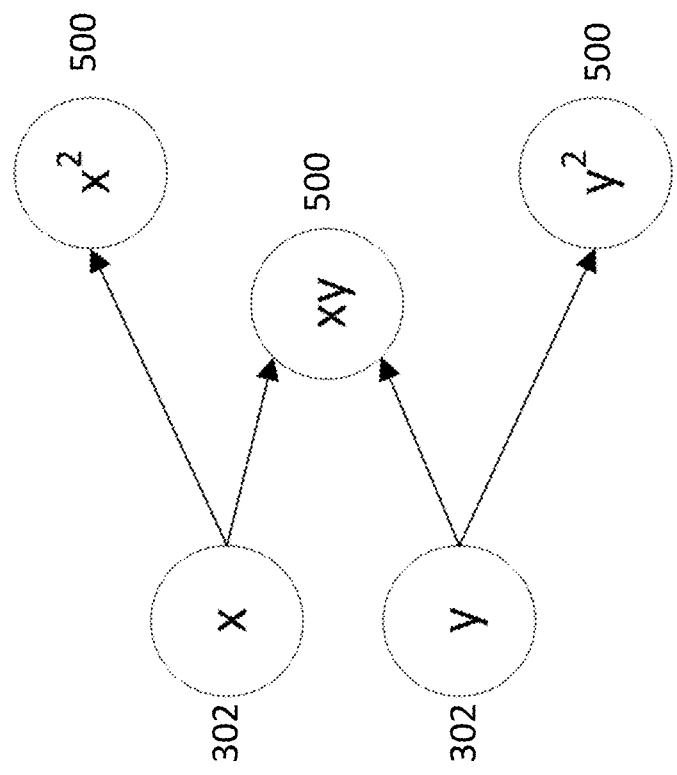
Figure 5 – Exemplary transformation of features

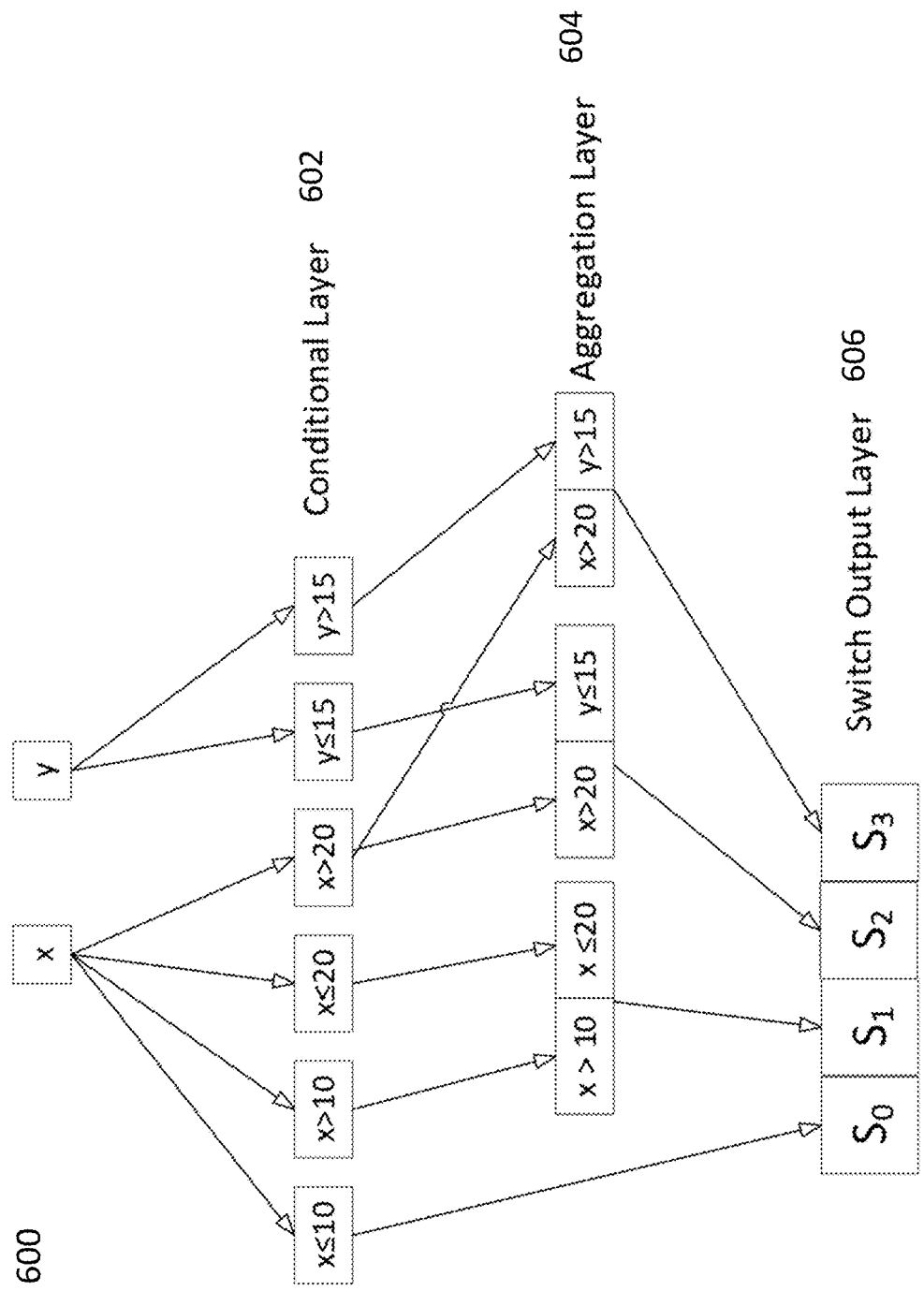
Figure 6 - Conditional network of an exemplary XNN

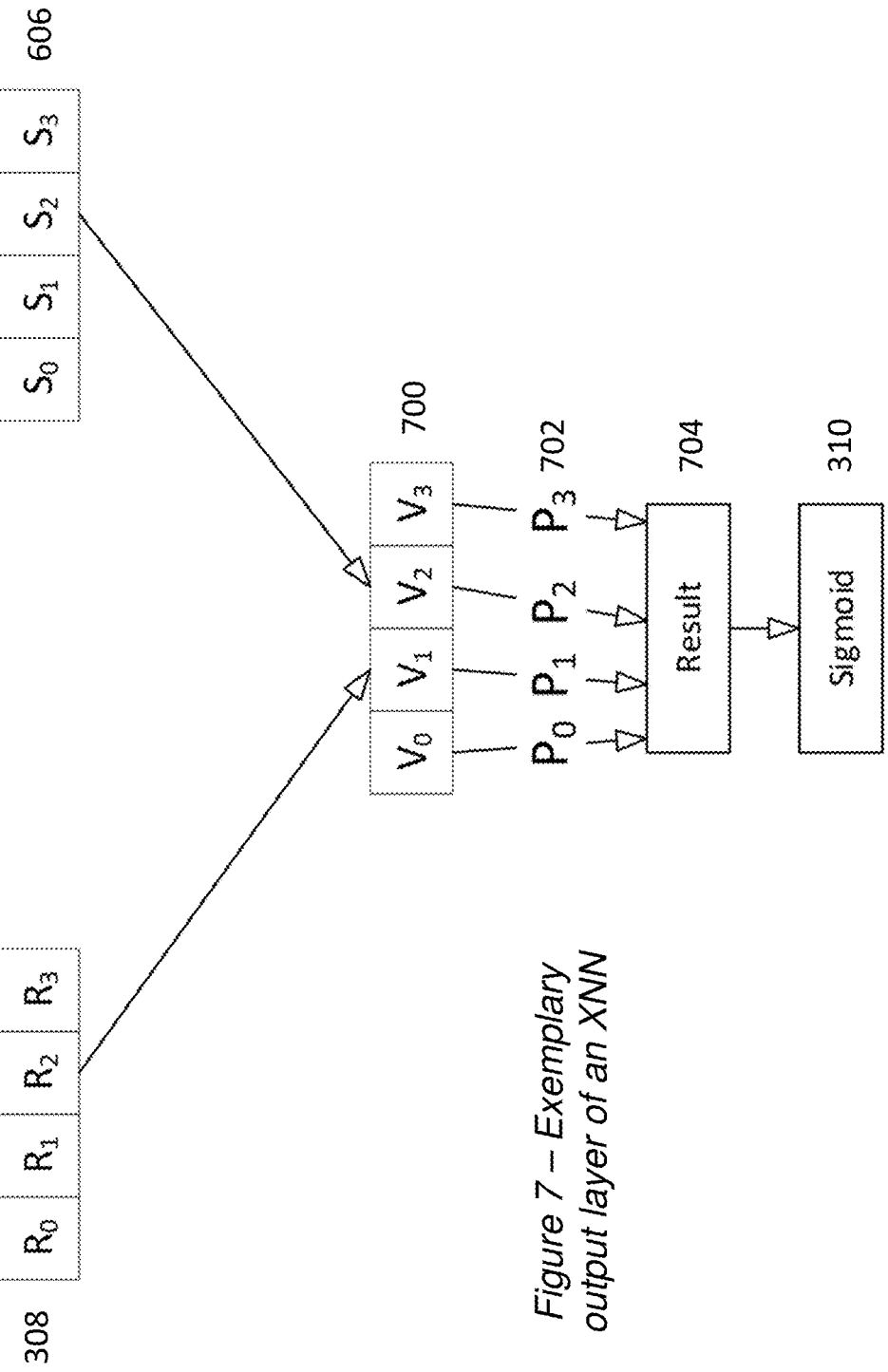
Figure 7 – Exemplary output layer of an XNN

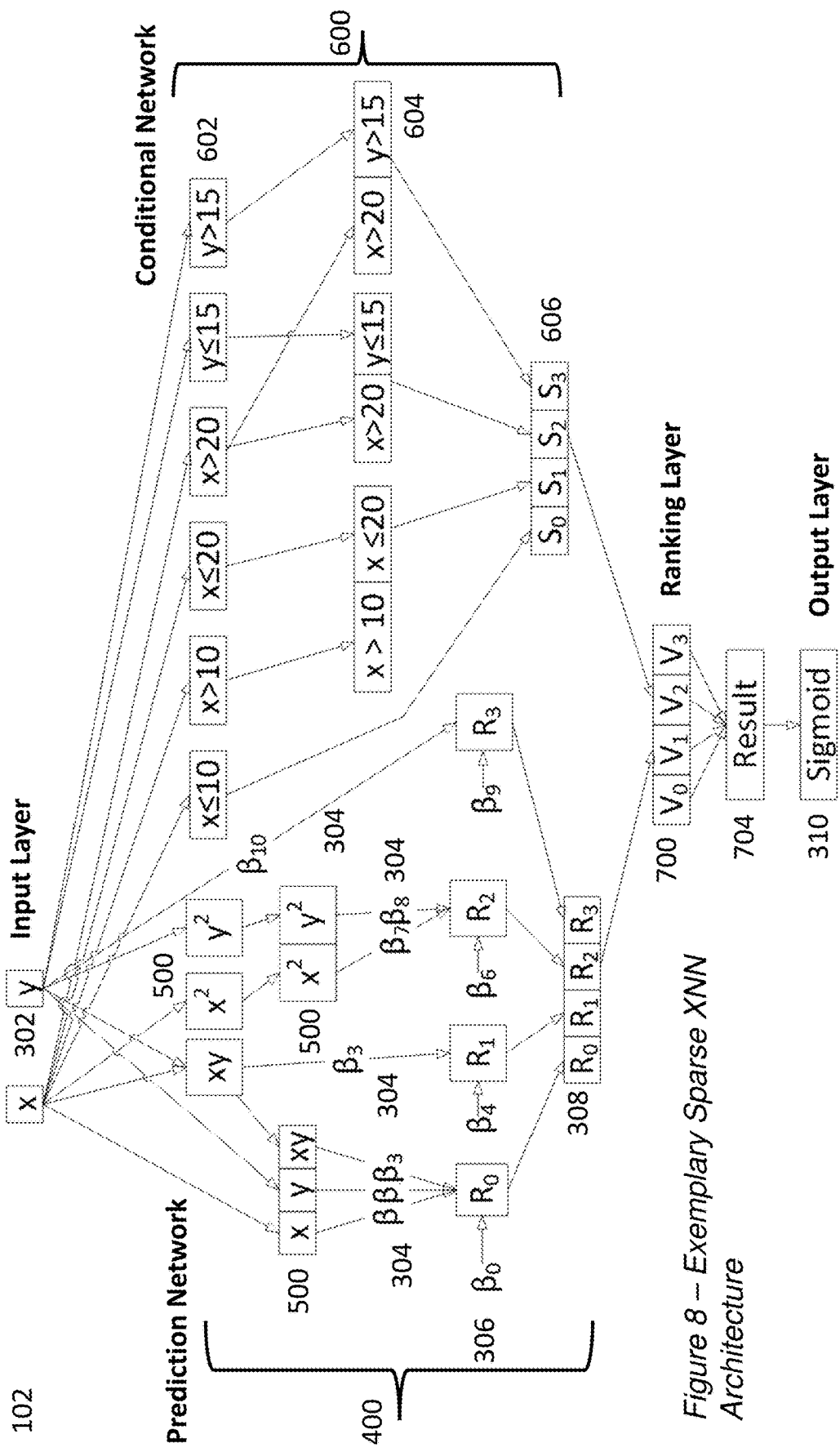
Figure 8 – Exemplary Sparse XNN Architecture

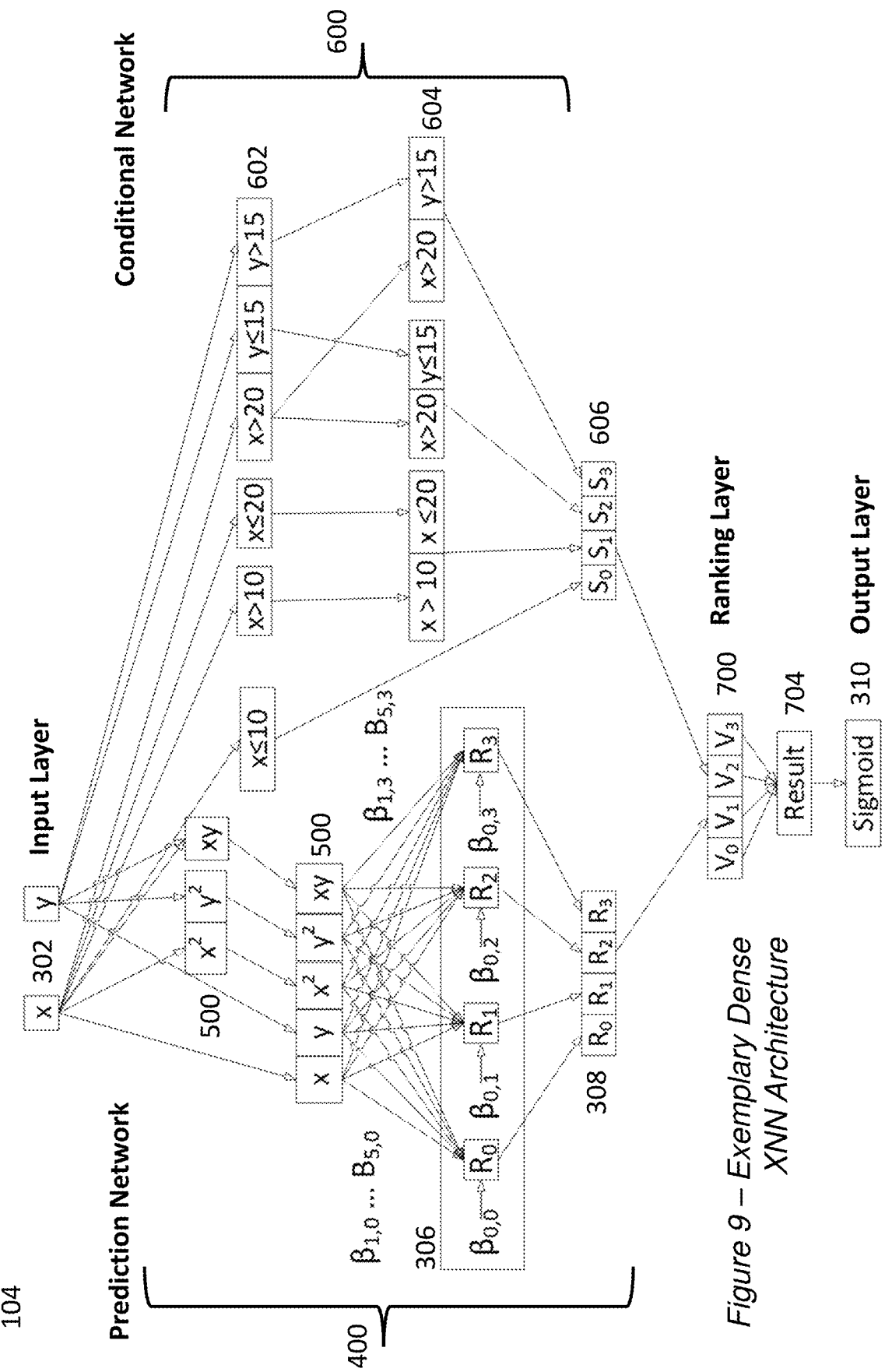
Figure 9 – Exemplary Dense XNN Architecture

Figure 11 – Micro Value Networks $R_0$ to $R_3$ which trigger if $S_0$ to $S_3$ are triggered.

Figure 12 –
Flowchart showing the combined Micro XNN Architecture

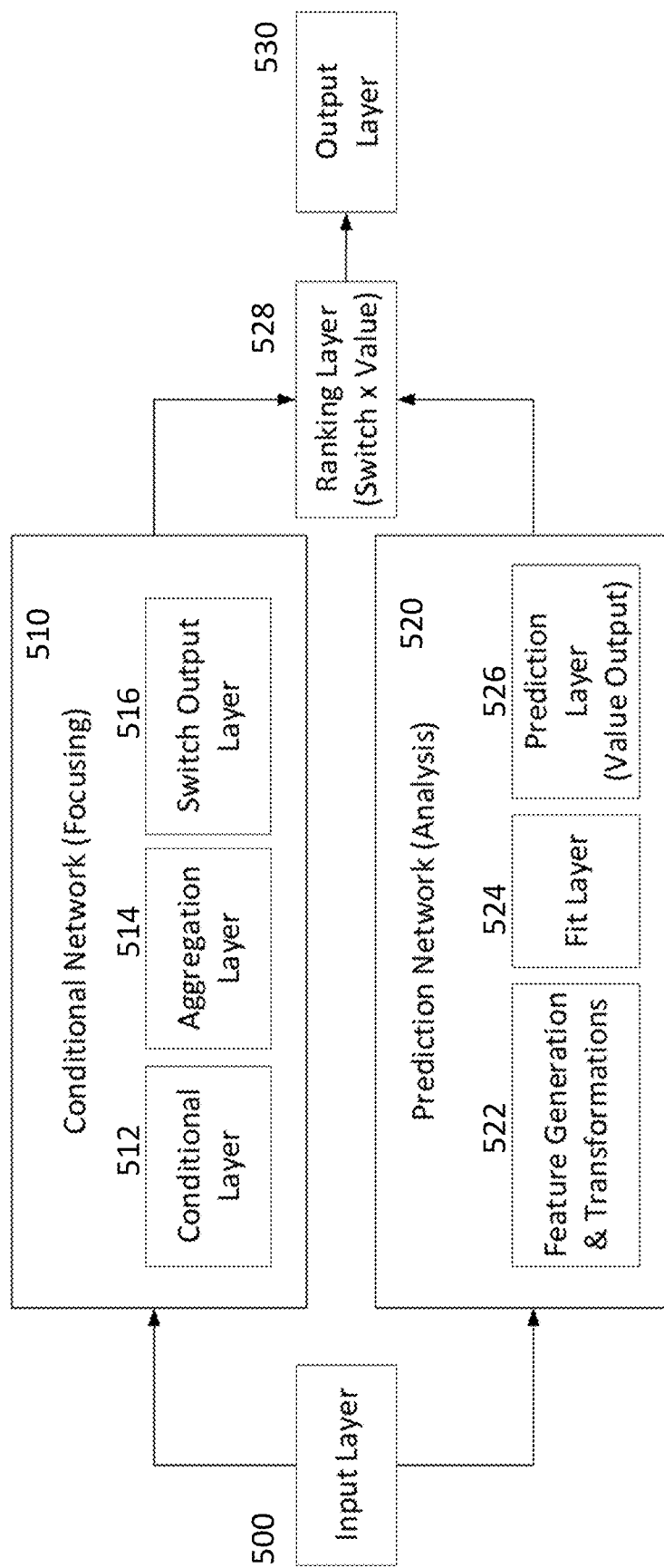
Figure 14 - High-Level XNN Architecture

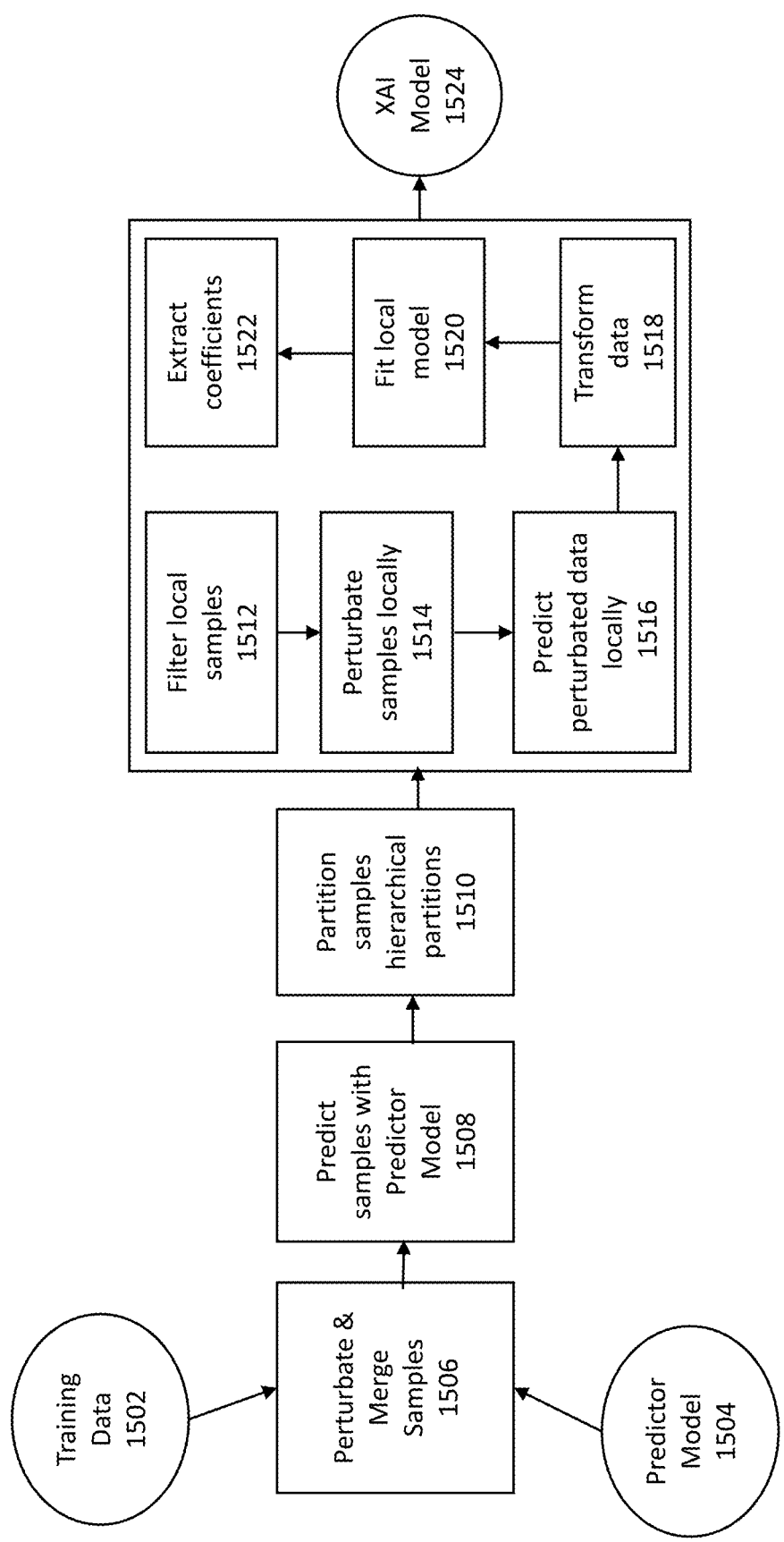
Figure 15 – Exemplary Induction Method

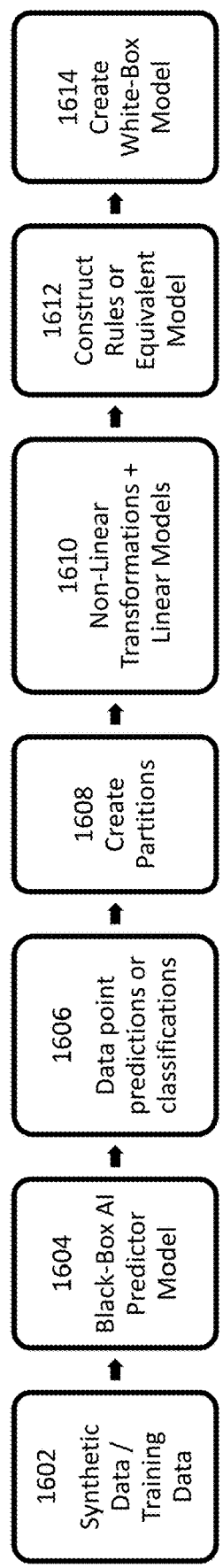
Figure 16 – High Level Induction Process

XAI AND XNN CONVERSION

CROSS-REFERENCE TO RELATED APPLICATIONS

The present patent application claims benefit and priority to U.S. Patent Application No. 62/945,481, filed on Dec. 9, 2019, which is hereby incorporated by reference into the present disclosure.

FIELD

A method for extracting a model from an existing machine learning model may be shown and described.

BACKGROUND

The terms interpretable and explainable may have different meanings. Interpretability may be a characteristic that may need to be defined in terms of an interpreter. The interpreter may be an agent that interprets the system output or artifacts using a combination of (i) its own knowledge and beliefs; (ii) goal-action plans; (iii) context; and (iv) the world environment. An exemplary interpreter may be a knowledgeable human.

An alternative to a knowledgeable human interpreter may be a suitable automated system, such as an expert system in a narrow domain, which may be able to interpret outputs or artifacts for a limited range of applications. For example, a medical expert system, or some logical equivalent such as an end-to-end machine learning system, may be able to output a valid interpretation of medical results in a specific set of medical application domains.

It may be contemplated that non-human Interpreters may be created in the future that can partially or fully replace the role of a human Interpreter, and/or expand the interpretation capabilities to a wider range of application domains.

There may be two distinct types of interpretability: (i) model interpretability, which measures how interpretable any form of automated or mechanistic model is, together with its sub-components, structure and behavior; and (ii) output interpretability which measures how interpretable the output from any form of automated or mechanistic model is.

Interpretability thus might not be a simple binary characteristic but can be evaluated on a sliding scale ranging from fully interpretable to un-interpretable. Model interpretability may be the interpretability of the underlying embodiment, implementation, and/or process producing the output, while output interpretability may be the interpretability of the output itself or whatever artifact is being examined.

A machine learning system or suitable alternative embodiment may include a number of model components. Model components may be model interpretable if their internal behavior and functioning can be fully understood and correctly predicted, for a subset of possible inputs, by the interpreter. In an embodiment, the behavior and functioning of a model component can be implemented and represented in various ways, such as a state-transition chart, a process flowchart or process description, a Behavioral Model, or some other suitable method. Model components may be output interpretable if their output can be understood and correctly interpreted, for a subset of possible inputs, by the interpreter.

An exemplary machine learning system or suitable alternative embodiment, may be (i) globally interpretable if it is fully model interpretable (i.e. all of its components are model interpretable), or (ii) modular interpretable if it is partially model interpretable (i.e. only some of its components are model interpretable). Furthermore, a machine learning system or suitable alternative embodiment, may be locally interpretable if all its output is output interpretable.

A grey-box, which is a hybrid mix of a black-box with white-box characteristics, may have characteristics of a white-box when it comes to the output, but that of a black-box when it comes to its internal behavior or functioning.

A white-box may be a fully model interpretable and output interpretable system which can achieve both local and global explainability. Thus, a fully white-box system may be completely explainable and fully interpretable in terms of both internal function and output.

A black-box may be output interpretable but not model interpretable, and may achieve limited local explainability, making it the least explainable with little to no explainability capabilities and minimal understanding in terms of internal function. A deep learning neural network may be an output interpretable yet model un-interpretable system.

A grey-box may be a partially model interpretable and output interpretable system, and may be partially explainable in terms of internal function and interpretable in terms of output. Thus, an exemplary grey-box may be between a white-box and a black-box on a scale of most explainable and interpretable (white-box) to least explainable and interpretable (black-box). Grey-box systems may have a level of modular interpretability since some of their components may be model interpretable.

Transfer learning is a method where a machine learning model developed for one task is reused as a starting point for another model for a different but related second task. Pre-trained models may be exploited to improve generalization of a model in another setting.

Deep learning models often require a large amount of resources to train. Vast and challenging datasets may be needed. Transfer learning provides an alternative method for training a model which may consume less resources. In transfer learning, a base network may first be trained on a base dataset and task, and then may be repurposed to a second target network to be trained on a target dataset and task.

However, the newly created deep learning model will be a "black-box" neural network. A black-box neural network is one which cannot provide explanations for the results or conclusions it reaches, and it may be more difficult to detect mistakes in a black-box neural network. The specific functions of each component of a black-box neural network are generally largely unknown and discovered via a laborious trial and error process.

SUMMARY

The methods described in an exemplary embodiment may be applicable to XAI and XNN models, which are examples of a fully interpretable model. XNNs have all the inner workings of the neural network interpretable, thus a number of conversions or optimizations may be applicable, while still maintaining logical equivalence.

The architecture behind an XNN may combine multiple local models into one global model. Local models analyze a small area within the entire search space. When a transaction is analyzed in a local manner, a linear model may be sufficient to explain the model. On the other hand, global models provide a holistic view. XNNs may merge the two-multiple partitions (or concepts) may represent the local zones and multiple linear models to explain each partition, while when combined they make up a global model. Additionally, XNNs go beyond linear data. They have been designed to cater to non-linear data by embedding transformations within the neural network itself, while still retaining explainability. Each layer, neuron and connection within an XNN has a precise, well known and understandable function, unlike standard ANNs which operate as a black-box, which the user interacts with based on their inputs and outputs alone and which therefore offer no explanations for their functions. XNNs are the first ever known fully white-box ANNs, giving rise to a new category of neural networks that are understandable and interpretable.

In an exemplary embodiment, a method for extracting a model from an existing machine learning model may be shown and described. In black-box models, transfer learning is a method of transferring knowledge with the objective of learning new patterns. Transfer learning may be uninterpretable. An exemplary embodiment presents an alternative approach to transferring knowledge by utilizing the interpretable structures of white-box systems, which is presented as system of conversions. An exemplary embodiment presents the concept of converting an explainable neural network into logically equivalent variants, which may not be possible with black box neural networks, which typically consist of multiple fully-connected layers. The white-box nature of an exemplary explainable neural networks (XNN) or explainable artificial intelligence (XAI) enables new ways of performing transfer learning and intelligent conversions of neural networks in ways that are impossible to do with a black-box model.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which:

FIG. 3A is an exemplary diagram demonstrating a linear function executable by a neural network.

FIG. 3B is an exemplary diagram demonstrating a logistic function executable by a neural network.

FIG. 4 is an exemplary diagram illustrating the architecture of local linear models for an exemplary XNN.

FIG. 5 is an exemplary diagram illustrating the transformation of features.

FIG. 6 is an exemplary architecture of a conditional network of an exemplary XNN.

FIG. 7 is an exemplary network illustrating a result output layer architecture.

FIG. 8 is an exemplary network illustrating a dense XNN architecture.

FIG. 9 is an exemplary network illustrating a sparse XNN architecture.

FIG. 14 is an exemplary embodiment of a High-Level XNN Architecture.

FIG. 15 is an exemplary induction method.

FIG. 16 is a high level induction process.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g. application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

An exemplary embodiment presents a method of converting between XAI models and several variants of XNN architectures which may be logically equivalent to each other while still serving a different purpose. The methods may include a universal XAI model rule-based format. Further, the model may incorporate sparse, dense, and/or micro XNN architectures. The formats may be interchangeable and may have the same level of interpretability. It is further contemplated that the method of converting between XAI models and several variants of XNN architectures may apply to the white-box components in a grey-box model.

Figure 1:
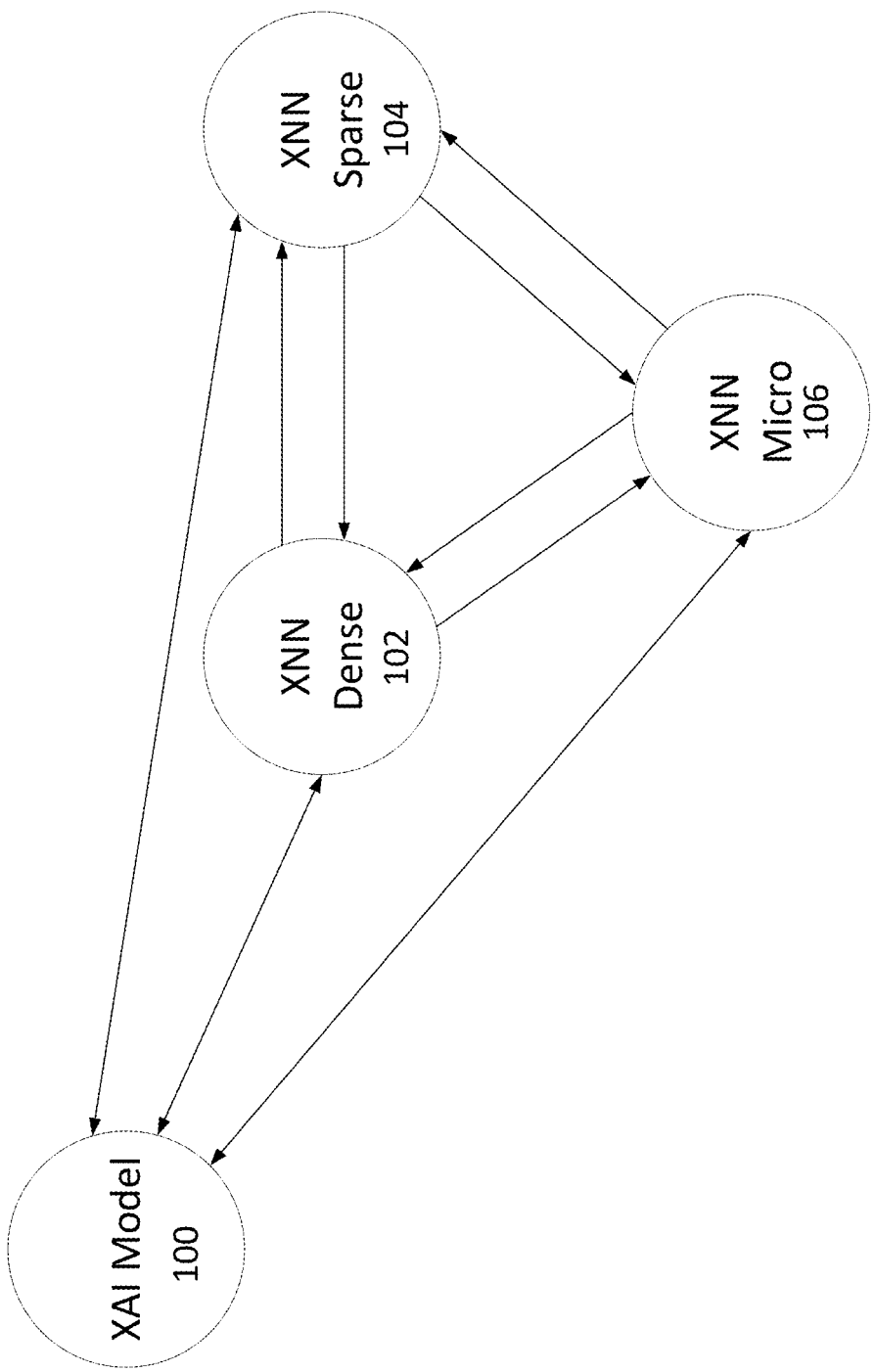
FIG. 1 is an exemplary embodiment of a schematic flow chart illustrating the interchangeability between formats of an XAI rule-based model and XNN variants.

Referring now to the exemplary embodiment in FIG. 1, FIG. 1 may illustrate the interactions between exemplary interchangeable representation formats of the XAI rule-based model and XNN variants. The XAI model 100 may be converted to or from a sparse XNN 104, dense XNN 102, or micro XNN 106. Further, each of the sparse XNN 104, dense XNN 102, and micro XNN 106, may be converted to or from each other or an XAI model 100. In a dense XNN 102, the layers of the network are fully connected by the neurons in a network layer. Each neuron may receive input from all the neurons in the previous layer. A sparse XNN 104, on the other hand, does not connect every neuron, therefore reducing the complexity of the system.

Figure 2:
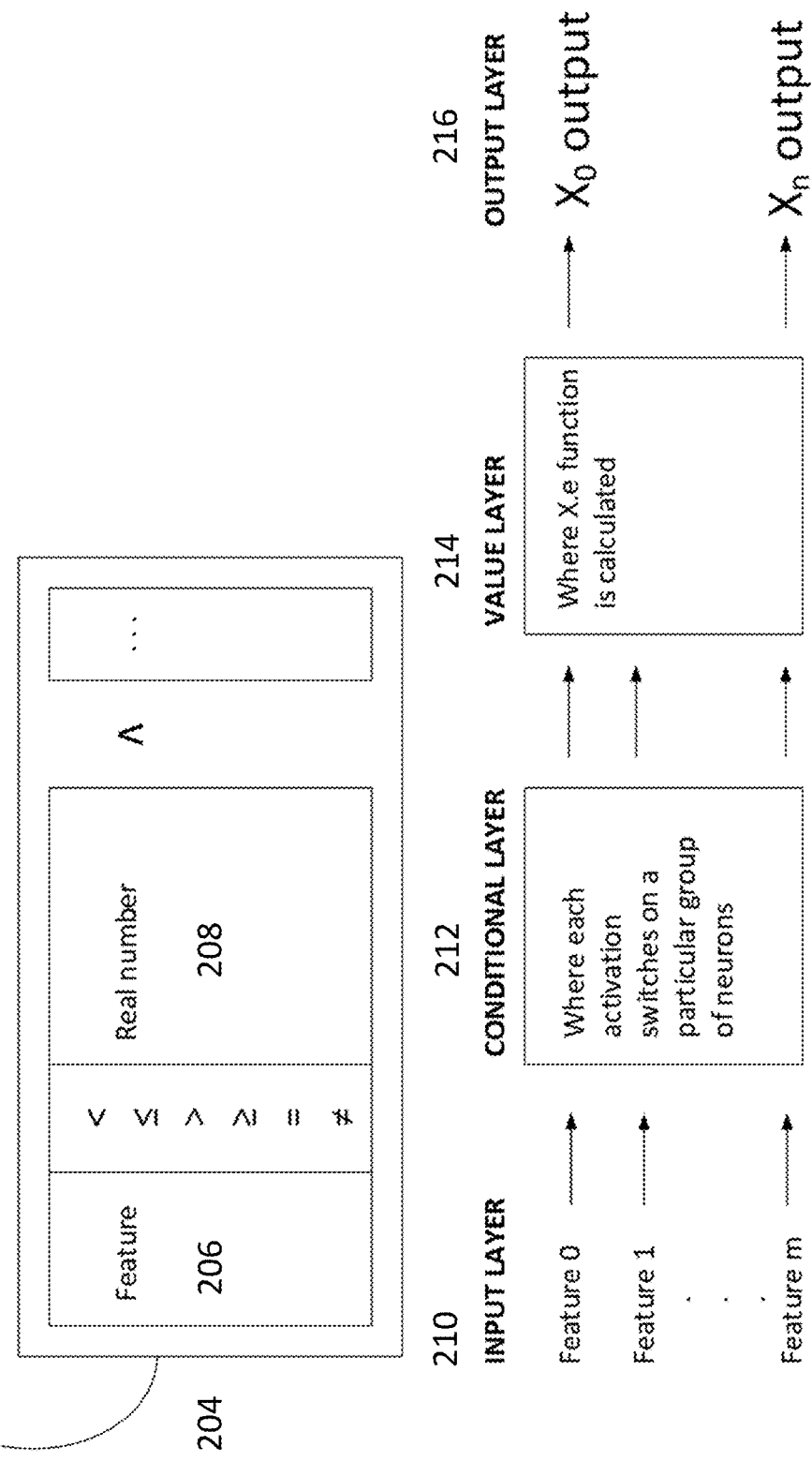
FIG. 2 is an exemplary schematic flow chart illustrating an exemplary XNN architecture with embedded rules.

Referring now to the exemplary embodiment in FIG. 2, FIG. 2 may illustrate an exemplary XNN architecture with embedded rules. First, a partition condition 202 may be chosen using a localization method that may reference a number of rules and encoded knowledge. Partitions can be non-overlapping or overlapping. In the case of non-overlapping partitions, the XNN may implement a single path in feed forward mode. In the case of overlapping partitions, the XNN may implement multiple paths in feed forward mode and may compute a probability or ranking score for each path. The partition condition 202 can be interpreted as focusing the XNN onto a specific area of the model that is represented. The partition localization method may be typically implemented in the form given by template 204 where various features 206 are compared to real numbers 208 repetitively using conjunctive normal form (CNF) or a logical equivalent such as disjunctive normal form (DNF), first-order logic assertions, and the like. In an alternative embodiment, other non-Boolean logical systems may be utilized such as Type 1 or Type 2 fuzzy logic systems, modal logic, quantum logic, probabilistic logic or other suitable type of logical system for the expression of logical or similar statements.

The localization method values, conditions and underlying equations may be selected and identified using an external process, such as an XAI model induction method or a logically equivalent method. In an alternative embodiment, the localization values, conditions and underlying equations may be partially or fully induced using an end-to-end approach using gradient descent methods such as back-propagation, Newton's method, Broyden-Fletcher-Goldfarb-Shanno method, forward-backward method, stochastic gradient descent, fast gradient method, optimized gradient method, fast proximal gradient method, quantum annealing, or any other such methods as may be understood. The chosen values are iteratively tested and varied until a certain level of accuracy is obtained in fitting the model to the relative test or synthetic data provided and/or by iteratively querying the initial black-box predictor model. An XNN may have four main components in its localization or focusing module, which may be part of a conditional network, which may include the input layer 210, a conditional layer 212, a value layer 214 and an output layer 216.

The input layer 210 is structured to receive the various features that need to be processed by the XNN. The input layer 210 feeds the processed features through a conditional layer 212, where each activation switches on a group of neurons. The conditional layer may require a condition to be met before passing along an output. In most cases, the conditional network may output binary values (one or zero), which determines which rule or partition to activate. Further, the input may be additionally analyzed by a value layer 214. The value of the output X (in case of a calculation of an integer or real value, etc.) or the class (in case of a classification application, etc.) X is given by an equation X.e that is calculated by the value layer 214. The X.e function results may be used to produce the output 216. It may be contemplated that the conditional layer and the value layer may occur in any order, or simultaneously.

In an exemplary XAI model induction method, the modeling system may input the data into the black-box system and may record the output corresponding to each input. In another embodiment the modeling system may use a trivial predictor model, like a simple mapping function, that returns the label or response for all or part of the input data set, which is equivalent to running the induction method directly on training data. In another embodiment the modeling system may use a suitable automatic predictor building method to create the predictor model directly from the training data. The addition of the black-box or predictor model as input to the induction method may help in reducing or eliminating errors and/or noise from the original input dataset.

Data points may be initially obtained from all or part of the training data, optionally combined with synthetically generated data. Synthetically generated data may be generated via an external process, such as a simulation system, world model, etc. The input data may also be the empty set, in which case, the induction method will work using the perturbated data obtained from the input predictor model. An optional data quality assurance function may also be applied to a subset of the input data points and/or the input data as a whole prior to execution of the induction method. The induction method builds a global model by dynamically creating perturbated sample data points that are then injected in the input predictor model, which may be a black-box, and the output result is then noted and combined with all other available data points from training and/or synthetic data. It may be contemplated that perturbated data may be utilized on its own without using the original training data. An exemplary embodiment of a perturbation method may utilize a combination of: random noise addition methods, rotation perturbation, projection perturbation, k-anonymization, Generative Adversarial Networks (GANs) or any other suitable perturbation method. The resulting combined data points may form the input to the partitioning function of the induction method. Data points from the predictor model may be continuous, discrete or categorical values. Predictor models that output a classification result may have such classification applier either on (i.) discretized output, via some appropriate transformation function that assigns the appropriate class label, or (ii.) probabilistic output that can be used directly or via some appropriate transformation function.

A next exemplary step may identify a hierarchy of "partitions". Each partition may cover a set or cluster of data points retrieved from the combined data available to the induction method. Each partition may define zero, one or more rules and may optionally contain child partitions with their respective associated rules. The extracted partitions may incorporate overlapping and non-overlapping partitions. In the case of overlapping partitions, some priority function may be used to determine which partition to activate. In an alternative embodiment, if more than one partition is activated, some aggregate function may be used to combine or split results from the multiple activated partitions. Various methods may be implemented for finding the rules or clusters of data points pertaining to a rule, as long as each partition has sufficient data to fit a linear model and is not too complex such that a linear model may not perform well. Non-linear transformations including but not limited to polynomial expansion, rotations, dimensional and dimensionless scaling, state-space and phase-space transforms, integer/real/complex/quaternion/octonion transforms, Fourier transforms, Walsh functions, continuous data bucketization, Haar and non-Haar wavelets, generalized L2 functions, fractal-based transforms, Hadamard transforms, Type 1 and Type 2 fuzzy logic, knowledge graph networks, categorical encoding, difference analysis and normalization/standardization of data and conditional features may be applied to an individual partition, prior to the linear fit, to enhance model performance.

A partition may be a cluster that groups data points optionally according to some rule and/or distance similarity function. Each partition may represent a concept, or a distinctive category of data. Partitions that are represented by exactly one rule have a linear model which outputs the value of the prediction or classification. Since the model may be modelled linearly, the coefficients of the linear model can be used to score the features by their importance. The underlying features may represent a combination of linear and non-linear fits as the induction method handles both linear and non-linear data and/or linear and non-linear predictor models.

An exemplary embodiment may be illustrated in mathematical terms. Referring to the exemplary embodiment in FIG. 15, FIG. 15 may illustrate an exemplary model induction method. In an exemplary embodiment, X may denote the input dataset 1502, and Predict(x) may denote the predictor model function with n outputs 1504. X may be a matrix with m dimensions. Each dimension (m) may represent the input features of X and each output may represent the number of classes (n). The input data set may be a combination of training data and synthetic generated data. Additionally, in an exemplary embodiment the samples may be perturbated 1506 using a function such as Perturbate(X), which may be any perturbation function to generate sample perturbed data, given some input training or test data X, where X may be a subset of the input data, some neighborhood of the input data, some suitable embedding of input/output/explanation data, or may even be trivially the empty set, in which case the perturbation function needs to query the predictor model using some form of a random or non-random pattern. Xp may denote the combination of the perturbated and original input dataset, Y may denote the output from the predictor model function 1508, such that $X_P = X \cup \text{Perturbate}(X)$, and $Y = \text{Predict}(X_P)$.

The hierarchy of partitions may be represented by P through an external function Partition 1510, such that Partition$(X_p, Y) = P$, where $P = \{P_1, \ldots, P_i, \ldots, P_k\}$ and k is equal to the number of rules in the case where each partition is defined by exactly one rule. The partitioning function may be a clustering algorithm such as k-means, Bayesian, connectivity based, centroid based, distribution based, grid based, density based, fuzzy logic based, entropy, a mutual information (MI) based method, or any other logically suitable methods. The partition function may also include an ensemble method which would result in a number of overlapping or non-overlapping partitions. In the case of overlapping partitions, an aggregation function may be used to combine or split the result from multiple partitions. The partition function may alternatively include association-based algorithms, causality based partitioning or other logically suitable partitioning implementations.

$R_i(x)$ may represent each rule in the $i^{th}$ partition. Each Rule ($R_i(x)$) may include multiple conditions, such that $R_i(x) = C_1 \wedge C_2 \wedge \ldots \wedge C_1 \wedge \ldots \wedge C_q$, where q may represent the number of conditions in the rule, and $C_j$ may be the $j^{th}$ condition with respect to the input matrix x of the $i^{th}$ rule (i.e. $i^{th}$ partition). The perturbated input matrix $X_P$ may be divided into k matrices, where k is equal to the number of rules, such that $X_L$ denotes the locally filtered matrix defined by $\{x | x \in X_P \wedge R_i(x) = \text{True}\}$, such that the union of $\{X_{L1}, X_{L2}, \ldots, X_{Lk}\} = X_P$ when partitions are non-overlapping. When partitions overlap on each other the union of $\{X_{L1}, X_{L2}, \ldots, X_{Li}, \ldots X_{Lk}\} \neq X_P$. When partitions overlap each other, a ranking function needs to be applied to choose the most relevant rule or be used in some form of probabilistic weighted combination method. In an alternative embodiment, if more than one partition is activated, some aggregate function is used to combine the results from multiple partitions.

A next exemplary step may involve fitting a local model to each partition, defined by Ri. $X_L$ may represent the inputs that are found in both $X_P$ and $R_i(x)$. In other words, $X_L$ may be the inputs or feature data that apply to the $i^{th}$ rule. The local samples may be filtered 1512. $X_L$ may then be perturbated 1514, and $X_{LP}$ may denote the combination of $X_L$ and a locally perturbated dataset of Perturbate(XL). Thus, $Y_L = \text{Predict}(X_{LP})$ which predicts perturbated data locally 1516. Finally, $X_T$ may be calculated by finding a transformation of $X_{LP}$ 1518, such that $X_T = \text{Transform}(X_{LP})$. The transform function may be a pipeline of transformations, including but not limited to polynomial expansions, rotations, dimensional and dimensionless scaling, Fourier transforms, integer/real/complex/quaternion/octonion transforms, Walsh functions, state-space and phase-space transforms, Haar and non-Haar wavelets, generalized L2 functions, fractal-based transforms, Hadamard transforms, Type 1 and Type 2 fuzzy logic, knowledge graph networks, categorical encoding, difference analysis and normalization/standardization of data. The transform function pipeline may further contain transforms that analyze sequences of data that are ordered according to the value of one or more variables, including temporally ordered data sequences. XT may generate new features, such that z represents the total number of features by the transformation function.

For each j in the range of 1 through n (i.e. the number of outputs), the system may calculate the local model in a linear manner 1520. $Y_L$ is a matrix including n vectors, one for each output, such that $Y_{Lj}$ represents the $j^{th}$ output vector. The linear model can be defined by $Y_{ij} = \text{Fit}(X_T, T_{Lj})$ where Fit is a function that fits a linear model, such as linear regression, logistic regression, kernel method, etc. The linear model defines a set of coefficients $\{\beta_0 \ldots \beta_z\}$ 1522 such that $Y_{ij} = \beta_0 + \beta_1 x_1 + \ldots + \beta_i x_i + \ldots + \beta_z x_z$. The linear model or a combination of linear models may provide the XAI model with the rules 1524. In an alternative embodiment, the fit of the local models may be achieved in one atomic Fit function using parallel programming or gradient-descent techniques, or a suitable equivalent. Note that $x_i$ could be a transformed feature such as polynomial (such as $x^2$), intersection (such as xy), conditional features (such as x>10 and y<2), Fourier transforms, etc. Note that $\beta_i$ could be either positive or negative, corresponding to positive or negative contributions to the model for the relevant transformed feature. The positive or negative contributions may also be commonly referred to as excitatory and inhibitory influences. Compression or regularization techniques may also be applied to simplify the fit of the local models, which indirectly also simplifies the resulting explanations. Finally, rules may be constructed from the various combinations of $Y_{ij}$.

$$\text{Rule}_1(x) = \{Y_{11}, Y_{1,2}, \ldots, Y_{i,n}\} \text{ if } R_1(x)$$

$$\text{Rule}_2(x) = \{Y_{21}, Y_{2,2}, \ldots Y_{2,n}\} \text{ if } R_2(x)$$

$$\text{Rule}_i(x) = \{Y_{i1}, Y_{i,2}, \ldots, Y_{i,n}\} \text{ if } R_i(x)$$

$$\text{Rule}_k(x) = \{Y_{k1}, Y_{k,2}, \ldots, Y_{k,n}\} \text{ if } R_k(x)$$

Further, additional functions may be applied to the final output of the rule. For example, the softmax function may be used for rules that define a multiclass classification system, such that:

$$Rule_i(x) = Softmax\left(\{Y_{i,1}, Y_{i,2}, \dots, Y_{i,n}\}\right) \text{ if } R_i(x),$$

and $$Softmax(x_i) = \frac{e^{x_i}}{\sum_n e^{x_n}}$$

In an alternate exemplary embodiment, the sigmoid function may be applied to the output for application to a binary classification algorithm, such that:

$$Rule_i(x) = Sigmoid(Y_{i1}) \text{ if } R_i(x)$$

$$Sigmoid(x) = \frac{1}{1+e^{-x}}$$

The induced model may be expressed in a universal format (such as first order symbolic logic) or may be used directly. It may be contemplated that a logically equivalent process to this induction method, or parts of it, may be re-created using an appropriate machine learning system that has been trained appropriately, for example, via gradient descent techniques, such as neural networks, transducers, transformers, autoencoders, spiking networks, memory networks, and/or reinforcement learning systems. Additionally, the extracted model may be global such that it captures the entire multi-dimensional space of the original model. The global model may be fully interpretable, even if the original model was not, and may still maintain a high-level of model performance or accuracy. The explanation may be completed simultaneously and in parallel with the answer and there may be no performance loss.

Referring now to exemplary FIG. 16, FIG. 16 may illustrate an exemplary method for extracting an explainable white-box model of a machine learning algorithm from another existing system. It may be contemplated that the target system is a black-box system, or any other contemplated system, machine learning algorithm, neural network, or the like. In an exemplary first step, synthetic data and/or training data may be created or obtained 1602. Perturbated variations of the set of synthetic data and/or training data may also be created so that a larger dataset may be obtained without increasing the need for additional synthetic data and/or training data, thus saving resources. It may be contemplated that the synthetic data and/or training data may be normalized prior to step 1602 or within any of the steps 1602, 1604, 1606, 1608, 1610, 1612 and 1614, using a suitable normalization method, such as min-max scaling, standard scaling or other suitable method. It may be further contemplated that an inverse normalization method be applied prior to step 1602 or within any of the steps 1602, 1604, 1606, 1608, 1610, 1612 and 1614, using an appropriate inverse of any normalization method that was applied. The synthetic data and/or training data may then be loaded into the target system as an input 1604. The target system may be a machine learning algorithm of any underlying architecture. The underlying architecture may be a black-box and thus unknown. In an exemplary embodiment, the machine learning algorithm may be a deep neural network (DNN). The target system may additionally contain non-linear modelled data. The underlying architecture and structure of the target model may not be known or needed since it may not be analyzed directly. Instead, the synthetic data and/or training data may be loaded as input 1604, and the output can be recorded as data point predictions or classifications 1606. Since a large amount of broad synthetic data and/or training data can be loaded as input, the output data point predictions or classifications may provide a global view of the target system. In an alternative embodiment, the target model may be split in a suitable manner such that only parts of it are induced by the induction method. For example, in the case of a convolutional neural network (CNN), only the fully connected non-convolutional layers may be induced, leaving the preceding layers (convolutional and pooling layers) to serve as transformed input to the induction method.

Still referring to exemplary FIG. 16, the method may continue by aggregating the data point predictions or classifications into hierarchical partitions 1608. Rule conditions may be obtained from the hierarchical partitions.

The process to find the partitions is, or the boundary of the partition, is an external function defined by Partition(X). Partition(X) may be a function configured to partition similar data and may be used to create rules. The partitioning function may include a clustering algorithm such as k-means, Bayesian, connectivity based, centroid based, distribution based, grid based, density based, fuzzy logic based, entropy or a mutual information (MI) based method. The partition function may alternatively include association-based algorithms, causality based partitioning or other logically suitable partitioning implementations.

The hierarchical partitions may organize the output data points in a variety of ways. In an exemplary embodiment, the data points may be aggregated such that each partition represents a rule or a set of rules. The hierarchical partitions may then be modeled using mathematical transformations and linear models. Any transformation function or combination of transformation functions may be used, including but not limited to polynomial expansion, convolutional filters, fuzzy membership functions, integer/real/complex/quaternion/octonion transforms, Fourier transforms, and others. The transformation function or combination of transformation functions may be applied prior to step 1608 and/or during step 1610. An exemplary embodiment may apply a polynomial expansion. Within step 1608, the hierarchical partitions may also be subject to one or more iterative optimization steps that may optionally involve merging and splitting of the hierarchical partitions using some suitable aggregation, splitting, or optimization method. A suitable optimization method may seek to find all paths connected topological spaces within the computational data space of the predictor while giving an optimal gauge fixing that minimizes the overall number of partitions. Further, a linear fit model may be applied to the partitions 1610. Additional functions and transformations may be applied prior to the linear fit depending on the application of the black-box model, such as the softmax or sigmoid function. The calculated linear models obtained from the partitions may be used to construct rules or some other logically equivalent representation 1612. The rules may be stored in any medium. For example, the rules may be stored as mathematical equations or may be represented using first order symbolic logic. Storing the rules as such may allow the extracted model to be applied to any known programming language and may be applied to any computational device. Finally, the rules may be applied to the white-box model 1614. The white-box model may store the rules of the black-box model, allowing it to mimic the function of the black-box model while simultaneously providing explanations that the black-box model may not have provided. Further, the extracted white-box model may parallel the original black-box model in performance, efficiency, and accuracy. The extracted white-box model W that is the result of conversion of the input predictor model U via the induction method, is an approximate or perfect bisimulation of U, i.e. W~U. The degree of bisimulation between the induced white-box model and the original predictor model is a parameter that can be set during steps 1608, 1610, 1612 and 1614. In terms of model and output interpretability, bisimulation is generally concerned with output interpretability in the case of the extracted model that is the end result of the induction method.

An embodiment may present a solution to transfer knowledge losslessly from logic-based rules to an Artificial Neural Network (ANN) implemented as an XNN while preserving both the knowledge in the rules and the explainability and interpretability of the model. The conversion may also be applied to several variants of the same XNN—which could be dense, sparse or micro. The conversion may be applied between all white-box XAI/XNN models in all directions.

The exemplary schematic diagram of a conditional network 510 is an expanded possible implementation of the conditional network 510 shown in FIG. 14. The conditional network 510 may include three main layers that can be combined together depending upon the implementation constraints. The first of these may be the conditional layer 512, which may be initialized according to the hierarchy of partitions being implemented in the XNN. The second of these may be the aggregation layer 514, which may be initialized for the first time by the external process that defines the XNN and can be subsequently refined using backward pass training methods such as gradient descent methods, etc. The third of the main layers may be the switch output layer 516 that combines the results of the aggregation layer 514 and conditional layer 512 together.

The switch output layer 516 may be also initialized by the same external process that defines the XNN and is typically implemented as the same process that initializes the aggregation layer 514, although it may be contemplated that these processes may be independent if necessary. All values in the connection weights between the neurons can be updateable using standard neural network training techniques. XNNs provide a further novel method of updating the connections themselves using machine learning methods such as genetic algorithms, Monte Carlo simulation methods, simulated annealing, reinforcement learning, etc. or via causal logic models.

In an exemplary neural network, the result of a layer in the neural network may be the dot product of the input and the weights of the connected neurons. For instance, the generalized linear equation $y=\beta_0+\beta_1 X_1+\beta_2 X_2+ \ldots \beta_m X_m$ is equivalent to the neural network in exemplary FIG. 3A. Similarly, the logistic function $y=\text{Sigmoid}(\beta_0+\beta_1 X_1+\beta_2 X_2+ \ldots \beta_m X_m)$ is equivalent to the neural network illustrated in exemplary FIG. 3B. The inputs 302 may be input features or variables. Each input 302 is weighted with a corresponding weight 304, leading to a resulting value 306. Various weights 304 may increase or decrease the impact of each input variable 302. Note the addition of the activation function such as sigmoid 310 in FIG. 3B. Activation functions are not limited to sigmoid. Any suitable activation function can be utilized to transform the output. The resulting values 306 may be combined in a value output layer 308.

Consider the following ruleset as an example:

$$f(x, y) = \begin{cases} \text{Sigmoid}(\beta_0 + \beta_1 x + \beta_2 y + \beta_3 y^2), & x \leq 10 \\ \text{Sigmoid}(\beta_4 + \beta_5 xy), & x > 10 \wedge x \leq 20 \\ \text{Sigmoid}(\beta_6 + \beta_7 x^2 + \beta_8 y^2), & x > 20 \wedge y \leq 15 \\ \text{Sigmoid}(\beta_9 + \beta_{10} y), & x > 20 \wedge y > 15 \end{cases}$$

The ruleset may be structured hierarchically in a multiple number of dimensions depending upon the number of input features.

In an exemplary embodiment, the rules may be defined as:

$R_0 = \beta_0 + \beta_1 x + \beta_2 y + \beta_3 xy$ $R_1 = \beta_1 + \beta_5 xy$ $R_2 = \beta_6 + \beta_7 x^2 + \beta_8 y^2$ $R_3 = \beta_9 + \beta_{10} y$ Referring now to exemplary FIG. 5, FIG. 5 may show the implementation of transformed features. Each newly transformed feature 500, such as $x^2$, $y^2$, and xy, can be processed by adding an additional neuron for each feature. For example, the feature 302 x can be combined with the feature y to produce the transformed feature 500 xy. Alternatively, the feature 302 x can be independently transformed to produce the feature 500 $x^2$.

Exemplary FIG. 4 may provide illustrated definitions for $R_0$ to $R_3$ in the form of a prediction network 400. The input features 302 or transformed features 500, such as $x^2$, $y^2$, xy, x, and y, are weighted by the weight coefficients $\beta_0$ to $\beta_{10}$, in order to produce the local models 306 $R_0$ to $R_3$. The resulting values for rules $R_0$ to $R_3$ may be combined and/or outputted in a value output layer 308.

Exemplary FIG. 6 may illustrate a conditional network which defines the conditional portion of the ruleset. The conditional network 600 may include three main layers that can be combined depending upon the implementation constraints. The conditional layer 602 is initialized according to the hierarchy of partitions being implemented in the XNN. The aggregation layer 604 is initialized for the first time by the external process that defines the XNN and can be subsequently refined using gradient descent methods such as back-propagation. The conditional network may be trainable or non-trainable. In the latter case, when applying back-propagation, the partitions remain static and only the value/prediction network is refined.

The conditional layer 602 may be initialized through the IF conditions defined in the XAI model. For example, "IF $x \leq 10$" may be defined in the XAI model and will generate a neuron in the transformed XNN model for $x \leq 10$. An IF condition with $x > 10$ and $x \leq 20$ will generate the aggregated neuron in the aggregation layer 604 for [$x > 10$, $x \leq 20$]. The output of each neuron may be either 1 or 0. The switch output layer 606 combines the results of the aggregation layer 604 and conditional layer 602 together.

As illustrated in exemplary FIG. 6, each condition may be split into partitions. Each box in the conditional layer 602 may represent a single partition. For example, "y>15" may be a single partition, representing a single rule which applies where "y>15" (and, thus, not in the alternative case where $y \leq 15$). Then, the partition may be combined with another partition in the aggregation layer 604. In the aggregation layer 604, the partition "y>15" is combined with the partition "x>20". These two partitions are then combined to create $S_3$, in the switch output layer 606.

Referring now to exemplary FIG. 7, FIG. 7 may illustrate an exemplary sub-network of an XNN which combines the switch output layer results 606 and the value output layer results 308. Note that XAI models and XNNs may incorporate overlapping and non-overlapping partitions. In the case of overlapping partitions some priority function may be used to determine which partition to activate. The resulting combination may produce a set of values 700, $V_0$ to $V_3$ in this exemplary embodiment. The set of values 700 may be further modified by the weights 702 $P_0$ to $P_3$, in order to produce a result 704. The weights in 702 may also be non-trainable and set to a fixed value of 1. Finally, the result may be modified by an activation function 310.

In an alternative embodiment overlapping functions may also be merged. Alternatively, partitions may also be split into further partitions.

Conversions can be applied using either sparse connections or by using a dense network. For reference, in scientific computing, the "sparsity" of a particular structure may be used in order to characterize the information density of that structure. To give one example, a "sparse" matrix may be one in which many or most of the elements in the matrix are zero, such as an identity matrix. Conversely, a "dense" matrix may be one in which most of the elements are nonzero. This may likewise be applied to networks; a sparse network may be one with fewer links than the possible maximum number of links within that network, while a dense or complete network may maximize the possible number of links.

Micro XNNs employ techniques similar to those of a sparse or dense network but are split up into multiple micro networks. Each network in a micro network may represent a local model which may be trained or used independently. These micro networks are the XNN equivalent of modules in traditional software engineering, allowing neural networks to be structured according to best practice modular design. This is another advantage of XNNs that traditional ANNs and Deep Learning models simply cannot do. In a dense XNN, coefficients may be zero-valued, with the result having more nodes and connections, since the zero-valued coefficients are still connections, and therefore the result is a dense network—the number of possible links has been maximized. On the other hand, in a sparse XNN, zero-valued coefficients may be eliminated, which results in a more compact network. Thus, a dense system of equations used as the basis of a sparse XNN, in which zero-valued coefficients are eliminated and the system of equations has entirely nonzero elements, may produce a sparse network, such as the exemplary embodiment in FIG. 8, since the number of possible links is lower than it could be. (The reverse may also be true, and the use of a sparse system of equations, in which most elements are zero, may produce a dense network in which connections between all cells are maintained, as shown in FIG. 9.)

Although sparse and dense networks are logically equivalent on the same ruleset, when gradient descent methods, such as back-propagation, are applied, they converge to a different result (i.e. different ruleset). For instance, a dense network, initialized with some zero values, may end up with a matrix of weights which is entirely non-zero after training is applied. On the other hand, a sparse network, where the zero values are not included, forces training to be more restrictive in a way that zero values remain zero. Sparse networks may be useful in scenarios when the ruleset may have been pruned, regularized or compressed to eliminate non-important features and/or coefficients for better generalization. In this scenario, a sparse network is more suitable as it maintains the compression or regularization.

Referring now to exemplary FIG. 8, FIG. 8 may illustrate an exemplary sparse XNN architecture. A sparse XNN may include a conditional network 600, as previously described. Additionally, the sparse XNN may include a prediction network 400, which may include transformed features 500, resulting rules 306, and the value output layer 308.

The prediction network in a sparse XNN may apply the dot product between the input 500 and the weights in 304. The result is equivalent to solving a linear function such as: $R_0 = \beta_0 + \beta_1 x + \beta_2 y + \beta_3 xy$. This is equivalent to the exemplary dot product:

$$\begin{bmatrix} \beta_0 \\ \beta_1 \\ \beta_2 \\ \beta_3 \end{bmatrix} \cdot [1 \quad x \quad y \quad xy] = [R_0]$$

Such dot product may be represented by the prediction/value network. In a neural network, the intercept of a linear equation is typically represented with a separate bias vector.

Both dense and sparse XNNs support rule refinement through incremental learning with gradient descent methods such as back-propagation. While a sparse network architecture may be more complex to construct, it may be ideal for low-memory footprint, low-powered hardware and edge processing, pruned rules with zero-valued coefficients, or for preventing overfitting with zero-valued coefficients. Further, sparse XNNs may employ efficient CPU processing techniques and are ideal for both large and small datasets.

The exemplary XNN architecture in FIG. 8 is logically equivalent to the following system of equations:

$$f(x, y) = \begin{cases} Sigmoid\ (\beta_0 + \beta_1 x + \beta_2 y + \beta_3 xy), & x \leq 10 \\ Sigmoid\ (\beta_4 + \beta_5 xy), & x > 10 \wedge x \leq 20 \\ Sigmoid\ (\beta_6 + \beta_7 x^2 + \beta_8 y^2), & x > 20 \wedge y \leq 15 \\ Sigmoid\ (\beta_9 + \beta_{10} y), & x > 20 \wedge y > 15 \end{cases}$$

In an exemplary dense XNN, every neuron in one layer may be fully connected to each neuron in the proceeding layer.

Referring now to exemplary FIG. 9, FIG. 9 may illustrate an exemplary dense XNN architecture. The dense XNN may include the same components as the sparse XNN, such as a prediction network 400 and a conditional network 600. However, the prediction network in the dense XNN may differ from that of a sparse XNN in that the nodes in one layer are fully connected to each node in another layer, even if the connection is via a zero-value weight, or coefficient as represented by the ruleset. For example, each node in the transformed feature layer 500 is connected to each rule output value in the resulting rule 306 in the next layer.

The difference between a sparse and a dense XNN may be the way the dot product is calculated. For example, in a dense XNN, although the exemplary diagram shows two separate steps 306 and 308 for visual purposes, this may actually perform as one step. In this exemplary step 306/308, matrix multiplication is performed between the weight/coefficient matrix and the vector/matrix of inputs/transformed values 500. The intercept of the equation may also be represented as a separate vector of biases. An exemplary matrix multiplication of the coefficient matrix and transformed values may be:

$$\begin{bmatrix} \beta_{0,0} & \beta_{0,1} & \beta_{0,2} & \beta_{0,3} \\ \beta_{1,0} & \beta_{1,1} & \beta_{1,2} & \beta_{1,3} \\ \beta_{2,0} & \beta_{2,1} & \beta_{2,2} & \beta_{2,3} \\ \beta_{3,0} & \beta_{3,1} & \beta_{3,2} & \beta_{3,3} \\ \beta_{4,0} & \beta_{4,1} & \beta_{4,2} & \beta_{4,3} \\ \beta_{5,0} & \beta_{5,1} & \beta_{5,2} & \beta_{5,3} \end{bmatrix} \cdot [1 \quad x \quad y \quad x^2 \quad y^2 \quad xy] = [R_0 \quad R_1 \quad R_2 \quad R_3]$$

$$R_0 = \beta_{0,0} + \beta_{1,0}x + \beta_{2,0}y + \beta_{3,0}x^2 + \beta_{4,0}y^2 + \beta_{5,0}xy$$
$$R_1 = \beta_{0,1} + \beta_{1,1}x + \beta_{2,1}y + \beta_{3,1}x^2 + \beta_{4,1}y^2 + \beta_{5,1}xy$$
$$R_2 = \beta_{0,2} + \beta_{1,2}x + \beta_{2,2}y + \beta_{3,2}x^2 + \beta_{4,2}y^2 + \beta_{5,2}xy$$
$$R_3 = \beta_{0,3} + \beta_{1,3}x + \beta_{2,3}y + \beta_{3,3}x^2 + \beta_{4,3}y^2 + \beta_{5,3}xy$$

Alternatively, in a sparse XNN, the dot product is split into multiple dot products 306, and combined into one layer 308. Each rule is calculated separately, using a separate dot product, in step 306. For example:

$$\begin{bmatrix} \beta_0 \\ \beta_1 \\ \beta_2 \\ \beta_3 \end{bmatrix} \cdot [1 \quad x \quad y \quad xy] = [R_0]$$

$$\begin{bmatrix} \beta_4 \\ \beta_5 \end{bmatrix} \cdot [1 \quad xy] = [R_1]$$

$$\begin{bmatrix} \beta_6 \\ \beta_7 \\ \beta_8 \end{bmatrix} \cdot [1 \quad x^2 \quad y^2] = [R_2]$$

$$\begin{bmatrix} \beta_9 \\ \beta_{10} \end{bmatrix} \cdot [1 \quad y] = [R_1]$$

Finally, the prediction network of the sparse XNN concatenates the output vectors into one vector 308 [$R_0$, $R_1$, $R_2$, $R_3$] so that matrix multiplication could be applied with the switch output in step 700.

Like a sparse XNN, a dense XNN may still support rule refinement through incremental learning with gradient descent methods such as back-propagation. However, the network architecture of dense XNNs may be simpler to construct as compared to the sparse XNNs. Dense XNNs may be ideal for high-powered hardware, rules with non-zero-valued coefficients and for implementing or analyzing high dimensional data. Dense XNNs may be efficient for GPU processing and are ideal for both small and large datasets, since it can take advantage of the GPU parallelism for computing efficient multiplications and other mathematical operations. Sparse XNNs may be useful for restricting training with regularization while dense XNNs may be useful for serving predictions and explanations. Quantization may also be applied on all kinds of XNN models including sparse/dense and micro. Since XNNs make use of wide learning, in addition to deep learning, quantization may have better effects due to fewer mathematical operations which are applied on low precision numbers. XNNs in general support both deep learning and wide learning methods.

XNNs may be a type of Wide Neural Networks (WNNs). WNNs may significantly outperform logically equivalent yet much more structurally complex Deep Neural Networks (DNNs) by magnitudes of order. WNNs may also be several times faster to train than DNNs.

The exemplary dense XNN illustrated in FIG. 9 is logically equivalent to the following system of equations:

$$f(x, y) = \begin{cases} sigmoid(\beta_{0,0} + \beta_{1,0}x + \beta_{2,0}y + \beta_{3,0}x^2 + \beta_{4,0}y^2 + \beta_{5,0}xy), x \leq 10 \\ sigmoid(\beta_{0,1} + \beta_{1,1}x + \beta_{2,1}y + \beta_{3,1}x^2 + \beta_{4,1}y^2 + \beta_{5,1}xy), x > 10 \wedge x \leq 20 \\ sigmoid(\beta_{0,2} + \beta_{1,2}x + \beta_{2,2}y + \beta_{3,2}x^2 + \beta_{4,2}y^2 + \beta_{5,2}xy), x > 20 \wedge y \leq 15 \\ sigmoid(\beta_{0,3} + \beta_{1,3}x + \beta_{2,3}y + \beta_{3,3}x^2 + \beta_{4,3}y^2 + \beta_{5,3}xy), x > 20 \wedge y > 15 \end{cases}$$

A dense network is logically equivalent to a sparse network after zeroing the unused features. Therefore, to convert a sparse XNN to a dense XNN, additional features may be added which are multiplied by coefficient weights of 0. Additionally, to convert from a dense XNN to a sparse XNN, the features with coefficient weights of 0 are removed from the equation.

For example, the dense XNN in FIG. 9 is logically equivalent to the following system of equations:

$$f(x, y) = \begin{cases} sigmoid(\beta_{0,0} + \beta_{1,0}x + \beta_{2,0}y + 0x^2 + 0y^2 + \beta_{5,0}0xy), x \leq 10 \\ sigmoid(\beta_{0,1} + 0x + 0y + 0x^2 + 0y^2 + \beta_{5,1}xy), x > 10 \wedge x \leq 20 \\ sigmoid(\beta_{0,2} + 0x + 0y + \beta_{3,2}x^2 + \beta_{4,2}y^2 + 0xy), x > 20 \wedge y \leq 15 \\ sigmoid(\beta_{0,3} + 0x + \beta_{2,3}y + 0x^2 + 0y^2 + 0xy), x > 20 \wedge y > 15 \end{cases}$$

Which can be simplified to:

$$f(x, y) = \begin{cases} Sigmoid\,(\beta_0 + \beta_1 x + \beta_2 y + \beta_3 xy), x \leq 10 \\ Sigmoid\,(\beta_4 + \beta_5 xy), x > 10 \wedge x \leq 20 \\ Sigmoid\,(\beta_6 + \beta_7 x^2 + \beta_8 y^2), x > 20 \wedge y \leq 15 \\ Sigmoid\,(\beta_9 + \beta_{10} y), x > 20 \wedge y > 15 \end{cases}$$

Where $\beta_0 = \beta_{0,0}$, $\beta_1 = \beta_{1,0}$, $\beta_2 = \beta_{2,0}$, $\beta_3 = \beta_{5,0}$ in rule 0; $\beta_4 = \beta_{0,1}$, $\beta_5 = \beta_{5,1}$ in rule 1; $\beta_6 = \beta_{0,2}$, $\beta_7 = \beta_{3,2}$, $\beta_8 = \beta_{4,2}$ in rule 2 and $\beta_9 = \beta_{0,3}$, $\beta_{10} = \beta_{2,3}$ in rule 3.

The logical equivalence applies to the feed forward pass. Once a network is converted to a dense XNN, and training is applied to it, zero-valued weights (i.e. coefficients) may be updated through back-propagation.

Figure 10:
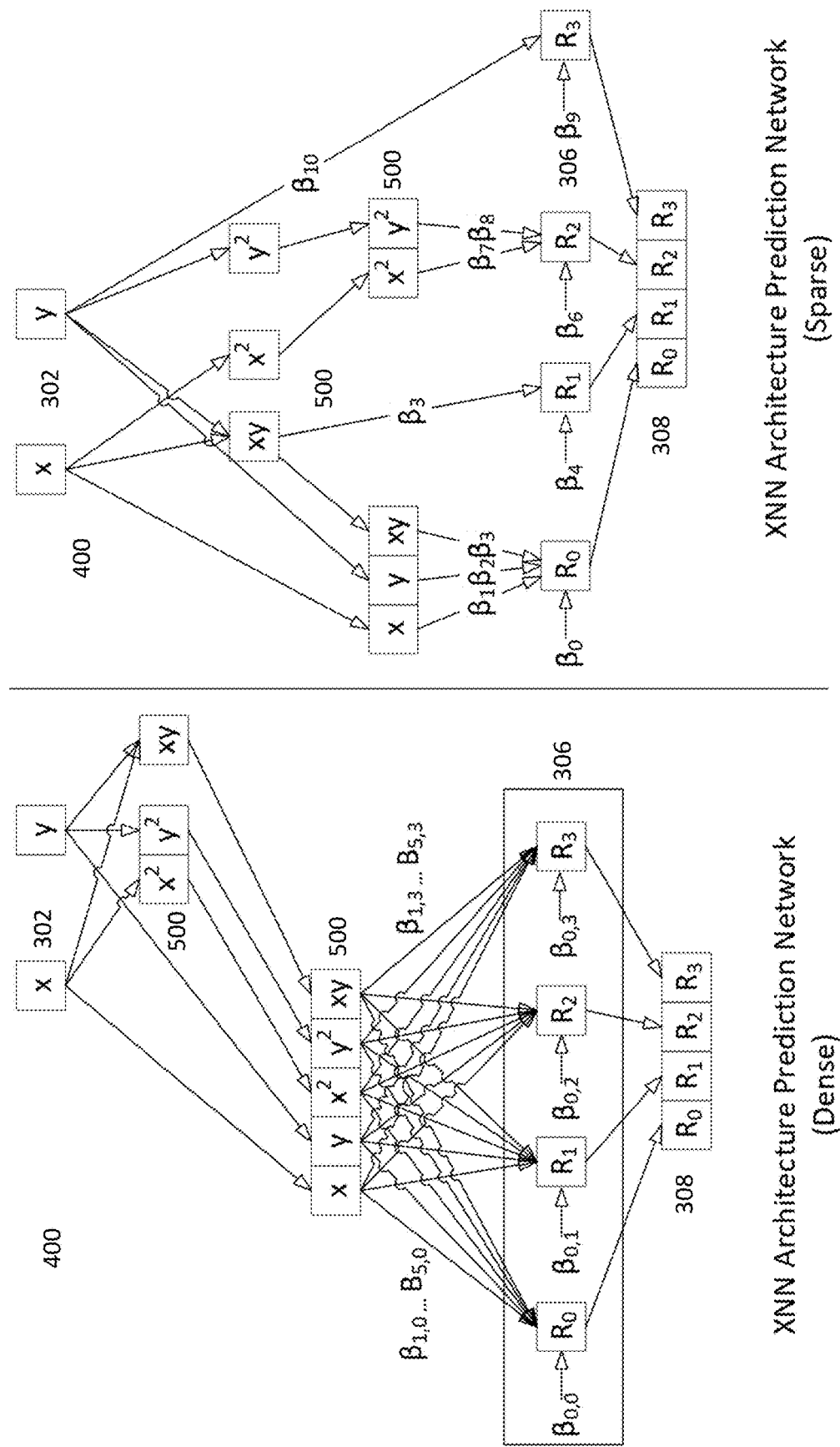
FIG. 10 is an exemplary comparison of a dense XNN architecture and a sparse XNN architecture.

Referring now to exemplary FIG. 10, FIG. 10 may show a comparison of a dense XNN and a sparse XNN which implement the same rule-based model. The use of one or the other depends on the use case. For instance, a sparse XNN may be used during training to restrict certain coefficients from becoming a non-zero value, which makes it possible to maintain a simpler model which had been regularized or compressed. Once training or refinement is applied, the sparse XNN may be converted to a dense XNN, which is fully connected in order to have a simpler network for serving predictions and explanations, which may result in faster execution times. Sparse networks may be slightly more complex to construct and execute but use less memory, making them suitable for applications where memory and space are of a major concern. These space and time and performance tradeoff guidelines may be initially used to select the best type of XNN for a particular application. Additional testing of the different variants on a case-by-case basis is recommended to determine the optimal architecture, as the XNN variants may be optimized for training ease, load time, memory and space utilization, execution speed, etc.

Sparse networks may require some prior knowledge about the interpretable model, which is required for initializing the sparse network. Such knowledge may be obtained using a suitable induction method. When training directly on a dense XNN, trained may be done as an external and/or integrated process which may utilize deep learning in an end-to-end or partial manner. Standard loss functions such as mean squared error and binary/categorical cross entropy are applicable to XNNs. However, a custom loss function may also be applied to XNNs such that it minimizes overlaps between partitions and minimizes the error between the prediction and the labeled output. Once the network is fully trained, it may converted to a sparse network; either for further training, or to deploy as an efficient low-memory network.

In an exemplary embodiment for medical imaging, an XNN may be used to classify and explain an X-ray image or an MRI scan. Dense and sparse XNNs may be applied to the different stages of the model lifecycle. It may be suitable for this particular use case that an XAI model is converted to an XNN after the initial model induction. It may then be required to convert the XAI model to a sparse XNN in order to refine the model in a global manner. The sparse XNN enables the XNN to take advantage of the regularization and compression which is already part of the XAI model. Once the model is fully trained, it may then be useful to convert the sparse XNN model to a dense XNN model in order to deploy in a production environment whereby a simpler architecture is needed in order to serve fast classifications and explanations. It may also be noted that in this embodiment, Sparse XNN and Dense XNN provide different level of accuracy. In this scenario, hardware resources may be sacrificed to increase model performance (accuracy), as needed. Such trade-offs may be applied on a case-by-case basis. In an exemplary embodiment, a dense XNN may be implemented as part of a large-scale MRI scanner, while a sparse XNN may be implemented as part of a smaller portable device.

Micro XNNs employ techniques similar to those of a sparse network but are split up into multiple micro networks. These micro networks are the XNN equivalent of modules in traditional software engineering, allowing neural networks to be structured according to best practice modular design. Micro XNNs may work in feed-forward pass and might not support rule refinement globally through gradient descent methods such as back-propagation. Micro networks may be small local models which may be trained independently on different machines and environments. Multiple local models may employ different training techniques, including distributed learning. A local model within a micro XNN may be either sparse or dense. Additionally, micro XNNs may employ different levels of precision for each micro model. As such, Micro XNNs may also suited for deployment in production type environments or for conversion to fixed hardware circuits such as: (i) ASICs, (ii) neuromorphic hardware or (iii) analogue/digital circuitry. Micro XNNs may also be suited for deployment and conversion to hardware circuits using quantum computers, with the reduced size of Micro XNNs enabling the complexity of conversion to quantum enabled hardware circuit to be reduced enough to make it a practical and viable implementation method. Micro XNNs can be used for serving predictions and explanations. One or more micro XNNs may be implemented in low-memory footprint, low-powered hardware and edge processing. A micro XNN can process high-dimensional data and can process fast transactional predictions and explanations. Back-propagation and related techniques can still be used in conjunction with micro XNNs by utilizing a simple transformation step from micro XNNs to one of the other XNN variants, such as sparse XNNs or dense XNNs, running the backward pass process and then re-converting back to micro XNN format without any loss of information whatsoever.

Further to the exemplary medical imaging embodiment, an alternative deployment may be required on a hand-held device that is low-powered. In this exemplary use case, a micro XNN may be suitable as it may require fewer low-hardware resources to process classifications and explanations.

Figure 11:
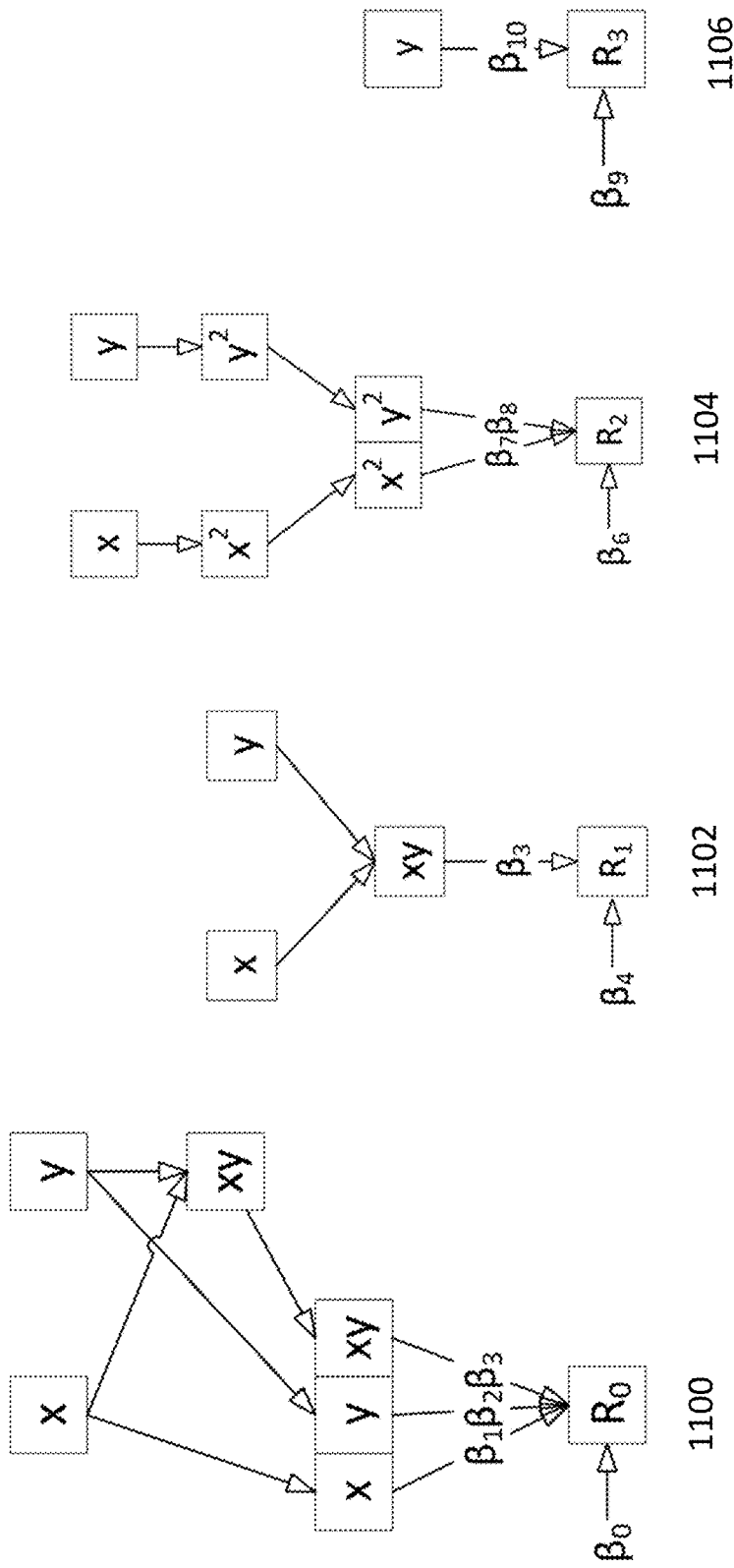
FIG. 11 is an exemplary set of value networks for Micro XNN.

Referring now to the exemplary embodiment in FIG. 11, FIG. 11 may illustrate four exemplary value micro-networks for $R_0$ 1100, $R_1$ 1102, $R_2$ 1104, and $R_3$ 1106. An XNN network may combine one or more micro-networks where the feed-forward pass is broken down into smaller parts. Take, for example, the conditional networks illustrated in FIG. 11. Once a conditional network is evaluated, the results of the switch output layer, $S_0$ to $S_3$, may determine which value network to execute. Separate micro networks may be used for the value network.

For example, the value network for rule $R_0$ triggers if $S_0$ is triggered, the value network for rule $R_1$ triggers if $S_1$ is triggered, the value network for rule $R_2$ triggers if $S_2$ is triggered, and the value network for rule $R_3$ triggers if $S_3$ is triggered.

Figure 12:
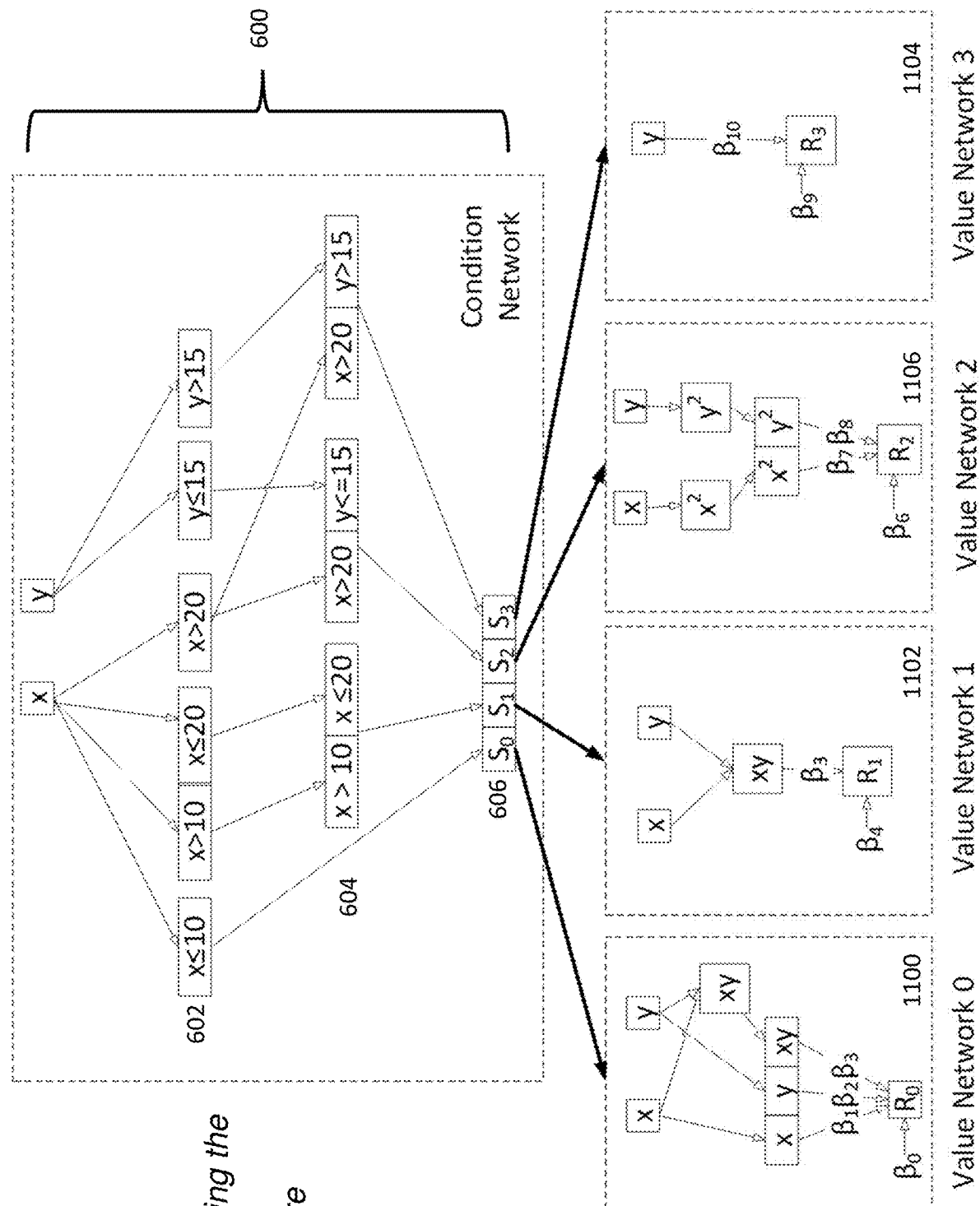
FIG. 12 is an exemplary flowchart illustrating a combined micro XNN architecture.

Referring to the exemplary embodiment in FIG. 12, FIG. 12 may illustrate a flowchart showing an exemplary combined micro XNN architecture. The conditional network 600 may be its own micro XNN and may interface with the separate value network micro XNNs 1100, 1102, 1104, and 1106. This allows for best practices in software engineering to be reflected in the XNN design. Modularization in this functional manner is only possible in XNNs due to their white-box nature.

An exemplary micro XNN architecture may allow for readily developed modules and other networks to be linked efficiently. This allows XNNs to be utilized in a development environment where, for example, the value networks are debugged and formally checked independently making them more amenable for both software and hardware applications, especially where mission critical applications are concerned, for example in real-time applications, aviation, space exploration, etc. Micro networks can be updated to a certain extent in micro segments, with gradient descent techniques or other methods applied to each individual module or value network. These updates can also be reflected in all other variants, thus allowing both modularity and efficiency to be combined together.

An XAI or XNN may be converted to a micro XNN. In an exemplary embodiment, the value network and the conditional network of an XNN are separated, creating two micro XNNs. The main difference between an XNN and a set of micro XNNs is that each micro XNN is a sub network forming the basis of an explainable neural module that is constructed in a manner such that each explainable neural module may operate independently by having a complete data flow, from input, transformation (such as polynomial)

to the output prediction. An "activation path" may be defined as a data flow path followed by one or more micro neural networks, starting from a particular input and ending in a particular output prediction. When converting an XNN from micro to dense or sparse, conversion is simply the combined result, without having duplicate neurons which calculate the same function. For instance, referring to the exemplary embodiment in FIG. 12, the neuron which calculates "xy" is only computed once in a sparse or dense XNN, but the connection of the neuron may change, in order to link it with R0 and R1. In the connected set of micro XNNs shown in FIG. 12, the value "xy" may appear twice but may be only calculated once converted to a dense or a sparse XNN.

An exemplary embodiment may allow human knowledge to be injected and incorporated into neural networks directly without any need for a training step or any training data, which is a major breakthrough for connectionist-based methods in artificial intelligence. Logic based rules that can be expressed in an if-then-else format can all be incorporated into an XNN, and rules can be converted using logic methods to an if-then-else format.

An exemplary embodiment also allows boosted learning to take place by incorporating knowledge directly from an induced XAI model into an XNN and then using gradient descent methods and new incremental data to improve the resulting XNN model over time by retaining the best performing parts of the XNN together with improvements in the current iteration.

Human knowledge injection is the process of defining new rules, or the related process of editing existing rules. Human rules may be written and represented in a generalized XAI rule-based format, such as in the disjunctive normal form, which allow human knowledge to be injected to XNNs via the conversion methods defined herein. Gradient descent methods make it possible for rules to be refined in a way that it now takes into consideration the human rules within the global scope of the entire model. Additionally, human rules may also be configured to be trainable or non-trainable. In the latter case, only machine-generated rules are refined, and the human rules may remain untouched. This allows for manual control over the resulting XNN model and ensures that there is safe operation of the resulting system that is predictable.

Further, an exemplary embodiment may also allow for Genetic Algorithms (GAs) and generic Monte Carlo Simulation Methods (MCSM) to be implemented. First, an XNN may be initialized, and then GAs and/or MCSMs may optimize the weights and create or delete connections dynamically. Such a feature goes beyond the typical capabilities of back-propagation and gradient descent methods as it allows the XNN itself to dynamically adjust its own structure and adapt to changing circumstances automatically, without requiring human intervention. This allows XNNs to go beyond the theoretical hard limits of what methods such as Deep Learning can achieve.

Figure 13:
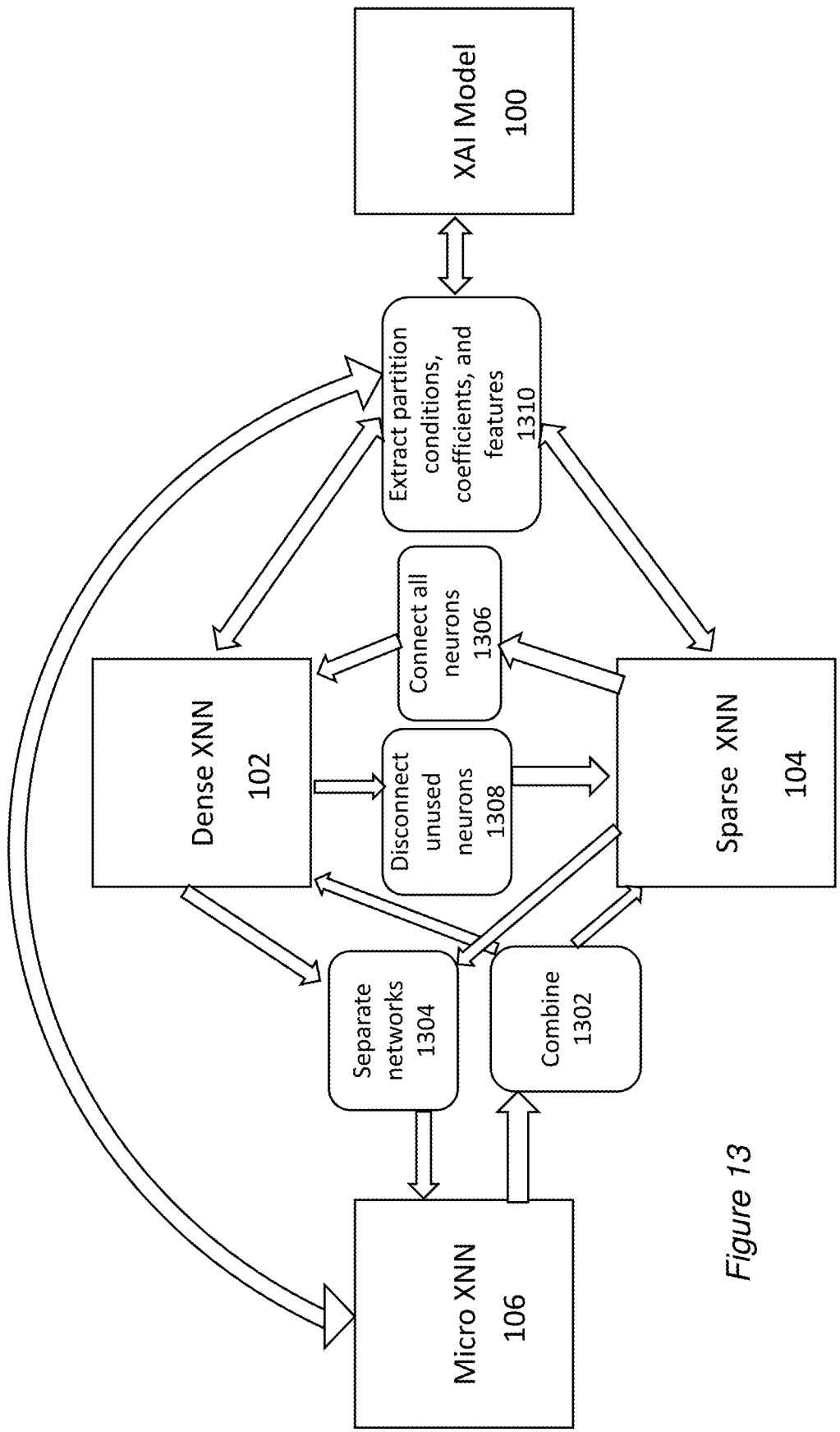
FIG. 13 is an exemplary embodiment of a schematic flowchart illustrating the conversions between XNN variants and the XAI model.

Referring now to the exemplary embodiment in FIG. 13, FIG. 13 is a schematic flowchart summarizing some possible conversions between XNN variants and an XAI rule-based model. As previously described, an exemplary micro XNN 106 may be converted into a sparse XNN 104 or a dense XNN 102 by simply combining 1302 the micro networks that make up the micro XNN 106. Alternatively, a dense XNN 102 or sparse XNN 104 may be converted into a micro XNN by separating 1304 the conditional network 600 from the prediction network. Neurons in the prediction network may be further separated into individual micro networks as well, and the set of micro networks may jointly operate as a micro XNN 106. Other types of conversions may be possible but not shown in FIG. 13, which covers typical application cases that have been encountered during the invention process.

In an exemplary embodiment, a sparse XNN 104 can be converted into a dense XNN 102 simply by connecting 1306 every neuron in every layer of the prediction network, and by inserting coefficients which were previously unused or have 0 value or suitable null value. The reverse can be accomplished, and a dense XNN 102 may be converted into a sparse XNN 104 by disconnecting 1308 the unused neurons which have the coefficient 0 or suitable null value.

In an exemplary embodiment, an XNN, dense XNN, sparse XNN and/or micro XNN may have at least one of its nodes substituted with a combination of finite state transducers in a lossless conversion process that maintains full logical equivalence.

In an exemplary embodiment, an XNN, dense XNN, sparse XNN and/or micro XNN may have at least one of its nodes transformed to utilize a combination of polynomial expansions, convolutional filters, fuzzy membership functions, integer/real/complex/quaternion/octonion transforms, and/or Fourier transforms in a lossless conversion process that maintains full logical equivalence.

The XNN conversion process can also convert an XNN back to an XAI model, including an exemplary rule-based XAI model. Since XNNs have a white-box architecture, the neurons, weights and connections can be directly mapped to a rule-based XAI model or a logical equivalent 1310. Such a transformation from an XNN to an XAI model works by first extracting the partition conditions from the conditional network 600, and then extracting the coefficients 304 along with the input/transformed features 302/500. Such coefficients and features may be used to generate the linear or non-linear equations as defined by the general rule-based XAI model. The resulting XAI model will be a logical equivalent of the original XNN and can be reconverted back to an XNN and vice-versa without loss of information or functionality. Additionally, it is contemplated that an XAI model may incorporate features from multiple XNNs, with each being assigned its own section in the XAI model and having a fusion process that fuses information from each XNN into a combined XAI model. Such a combined XAI model may be reconverted back to a larger XNN if all the rules are compatible with encoding in a single conditional layer of the XNN, or a network of XNNs that are combined within one larger XNN.

An exemplary embodiment also allows for selective deletion of a particular logical rule or set of rules from the resulting XNN, allowing neural networks to comply with privacy laws and allow assertion of ownership rights over training data sets to take place effectively and in line with best practices in Europe, USA and the rest of the world.

The following are a few exemplary embodiments of XNNs:

Convolutional XNNs (CNN-XNNs) allow convolutional layers to be seamlessly integrated with XNNs, giving them the capability of processing images, 3D data and other signal processing that is amenable to convolutional feature identification, transformation and extraction. CNN-XNNs may incorporate a set of one or more convolutional layers as part of a pre-processing step between the input features and the input to the conditional and prediction networks of an XNN. The original features together with the output from the convolutional layers are both treated as input to the XNN. The convolved features may also be used in conditions placed in the conditional layer. The output from the convolutional layers may also be dimensionally reduced and also potentially partially or fully deconvolved. The convolutional filters or kernels may be used in the generation of an appropriate explanation in an intuitive and human readable manner.

Example applications of CNN-XNNs involve image interpretation and diagnosis explanation of X-Ray and MRI images in medical devices; LIDAR and stereoscopic image data explanation and fused vision-control model explanation in autonomous air, land, sea, underwater and space indoor and outdoor vehicles; object and event detection and explanation of images in various application domains such as traffic cameras, UAV and satellite imagery, social media network photos, etc. Most currently known image or video or 3D data-based applications of Artificial Intelligence can incorporate CNN-XNNs to add explanatory capabilities to such applications.

Capsule XNNs (CAP-XNNs) preserve hierarchical information captured during the convolution steps by a CNN-XNN. CAP-XNNs may thus be considered as an alternative variant to standard CNN-XNNs. CAP-XNNs add a capsule network in between the input layer and the condition and prediction layers in the XNN. CAP-XNNs are similar to CNN-XNNs but since the capsule network can also preserve hierarchical information, and XNNs utilize hierarchical partitions and hierarchical notions of explanations, such hierarchical information from the capsule network layers can be directly used by the XNNs. CAP-XNNs may thus offer different performance than CNN-XNNs due to the addition of hierarchical information. The example applications of CAP-XNNs are identical to CNN-XNNs. CNN-XNNs and CAP-XNNs are largely completely replaceable by each other, ensuring that a CNN-XNN can be swapped in for a CAP-XNN and vice-versa. The CAP-XNN combination is likely to be more computationally powerful and expressive due to the presence of hierarchical information. Alternative current and future enhancements to CNNs that add hierarchical information will also be compatible with XNNs, opening up possibilities of having other XNN options that are not based on capsule networks but some other variant on convolutional networks. As long as the convolutional aspect is kept, these variations may be implemented into an XNN.

Text XNNs (T-XNNs) are a variant of XNNs that can handle text processing and textual data including syntactic and semantic information. T-XNNs may include a processing step for the input features that transform text data into suitable vector representations, and may thus incorporate techniques like word2vec and end-to-end processing for textual feature engineering, and the like. T-XNNs may typically take advantage of the white-box nature of XNNs to optionally incorporate taxonomical knowledge and also external linguistic knowledge as part of both the conditional and prediction networks in the XNN. The incorporation of such knowledge may lead to an improvement in the T-XNN performance and also in its explanatory expressiveness.

T-XNNs may be typically combined with sequence processing in the XNN prediction network, such as the extensions described for Predictive and Recurrent XNNs (PR-XNNs). Example applications of T-XNNs are as part of a document understanding system; a machine document translation system; an information retrieval or other form of search engine system; a semantically based knowledge extraction and understanding system, as well as any other embodiments that have to do with text processing. T-XNNs also open up the possibilities of having better control and understandability of the resulting neural network models, which is a barrier to further improvement in traditional black-box neural networks. For example, a T-XNN can explain the learnt grammatical rules for a particular set of training documents, corpus, or input language, which can then be analyzed and improved collaboratively using a human review step. The initial grammatical rules may be learnt automatically using the T-XNN initialization process without human intervention. From the first review onwards, such reviews can then re-incorporate suggested edits into the T-XNN, allowing for a virtuous cycle of machine and human collaboration and semi-supervised learning to improve performance. T-XNNs support supervised, semi-supervised and unsupervised modes of learning. As T-XNNs are also still compatible with gradient descent and other neural network training methods, all the advantages of re-training are available for a T-XNN.

Speech XNNs (S-XNNs) are an extension of XNNs for speech recognition and generation, adding an explanation to speech recognition by inserting an XNN or alternatively using an induced model as part of the speech recognition solution. S-XNNs incorporate a speech model as part of a pre-processing step between the input features and the input to the conditional and prediction networks of an XNN. The original features together with the output from the speech model are both treated as input to the XNN. The speech model features may also be used in conditions placed in the conditional layer. The output from the speech model may also be dimensionally reduced and also potentially partially or fully encoded or decoded. The speech model data themselves may be used in the generation of an appropriate explanation in an intuitive and human readable manner. Speech models may be in the form of a speech specific neural net or other form of machine learning model such as Bayesian networks, HMMs, and other models used in automated speech modelling. For speech generation, an S-XNN can, for example, be used to generate explanations of why a particular phoneme and intonation has been selected. S-XNNs can also be used to explain why particular interjections, fillers, non-lexical vocables and other breaks and irregularities have been inserted in the speech output to make them sound more natural. Example applications of S-XNNs are for automated speech recognition systems; automated speech generation systems; intelligent personal, home and office assistants; speech based control software and hardware systems, like those used to control a wide variety of industrial machinery and in transportation and aviation; speech control systems for pilots and future autonomous vehicle applications; speech based interfaces and agents; call center and telemarketing systems; telecoms hardware that utilizes automated speech recognition and generation; conversational and dialogue agent systems and the like.

Dialogue and Conversational XNNs (QA-XNNs) automate conversational, dialogue and question & answering (Q&A) systems in combination with XNNs. Given a specific question, an explainable neural network outputs the answer along with an explanation as to why such answer has been specified. QA-XNNs incorporate additional context in the conditional and prediction networks of an XNN to keep track of the current status of a conversation, dialogue or Q&A session. QA-XNNs may also incorporate multiple XNNs within an overall control loop structure or system that enables multiple iterative requests and queries to be executed over the duration of a user session. The XNN explanation coefficients for a QA-XNN incorporate state information and if used in an overall control loop system, some form of positional information to help generate an appropriate response to that particular loop or iteration in a session. QA-XNNs take advantage of the white-box nature of XNNs to incorporate additional context sensitive information especially in the prediction network in a seamless manner. It is contemplated that QA-XNNs will be used to replace existing neural networks in existing Q&A systems in a transparent manner. Due to the inevitable iterative and causal nature of QA-XNNs, it is contemplated that QA-XNNs will be combined with Predictive and Recurrent XNNs (PR-XNNs) and Causal XNNs (C-XNNs) in a number of practical embodiments. For most applications, QA-XNNs will also be used in conjunction with T-XNNs, unless the input features for the QA-XNNs have already been processed by some other separate system that has encoded semantic attributes and knowledge, etc. Example applications of QA-XNNs include an automated chatbot system such as those used for automated reservations and assistance; interactive expert systems and search engine systems; and in applications where the reason underlying a particular answer needs to be further explained. The advantage of using a QA-XNN is the addition of the capability of the implementation to be capable of answering questions that refer to why a particular answer has been given by the system, allowing for better interaction between people and machines and also enabling a better understanding to form as a direct consequence. Feedback from this process can also be used in subsequent re-training and refinement processes to make Q&A systems that utilize QA-XNNs to improve their accuracy and usefulness at a faster accelerated rate than other systems that do not utilize explanations as part of their improvement and training pipeline.

Predictive and Recurrent XNNs (PR-XNNs) add an element of time and or sequence to the input and to the output. Such XNNs can match an input sequence and identify its trend while outputting and forecasting possible outputs together with the explanation for each possible output. Such XNNs may utilize recurrence in the explanation and have parts of the explanation refer to itself in a modular manner. The specific type of predictive architecture may give rise to different variants of PR-XNNs, for example a long short-term memory unit (LSTM) PR-XNN or a gated recurrent unit (GRU) PR-XNN.

PR-XNNs add contextual positional information in the conditional and prediction networks of an XNN. This contextual positional information may also form part of the output if required, depending upon the specific application and implementation. The contextual positional information may also be added to the matched answer and explanation pairs, as it may be necessary to precisely distinguish PR-XNN output as part of a sequence of output items rather than a single output item.

PR-XNNs are contemplated to typically have some form of recurrence relations in the prediction network, and to a lesser extent may also need recurrence relations in the conditional network. The recurrence relations are learnt during the PR-XNN initialization step from the original predictor model. For example, if the original predictor model is an LSTM network, the recurrence relations may reflect the LSTM behavior as part of the underlying explanation given by the PR-XNNs.

It may be contemplated that a practical implementation will either completely replace the original model, so in the example case, the LSTM model may be implemented as part of the prediction network of the PR-XNN; or alternatively, the original predictor may be placed either before or after the input layer of an XNN. When the original predictor is placed before the input layer of an XNN, the resulting PR-XNN will treat the output of the original predictor as a sequence of input features, just like any other black-box predictor model that is induced to a white-box XNN. When the original predictor model is placed after the input layer of an XNN, the resulting PR-XNN will have an extra data that ensure that any explanation coefficients are passed through the predictor model. For example, if an LSTM is placed in between the input layer and the conditional and prediction networks of an XNN, or an LSTM is incorporated as part of the prediction network of an XNN, the LSTM model needs to pass through the explanation coefficients in order to make sure that the resulting PR-XNN is still a white-box. This passthrough innovation allows a PR-XNN to remain a white-box even if an element in its prediction is effectively a black-box or a grey-box with a mix of white-box elements and black-box structure.

PR-XNNs can also incorporate an LSTM or similar model after their output layer, allowing the LSTM to learn to predict the explanation itself. It may be contemplated that similar models, such as RNNs, Transformer, Bayesian Networks, Markov Models and other suitable models may be utilized instead of an LSTM. Such a combination of LSTMs or other similar models with PR-XNNs can lead to efficient new systems that not only generate an explanation from a single data item and/or ordered or unordered sequence of data items, but also be capable of predicting possible explanations. This capability of PR-XNNs makes them particularly suitable for industrial applications that need to anticipate the consequences of planned actions prior to actually executing them.

For example, in an industrial robotics manufacturing application involving a robot arm, the predicted explanations for a set of movement commands can be used to determine whether such movement commands will lead to an unsafe situation for any human operators, living objects or inanimate equipment that may be in the proximity of such robotic arm. PR-XNNs can thus open up a new set of capabilities in industrial and commercial and non-commercial applications that allow safety to be part of the control loop of automated machinery, apparatus and systems.

Another example of the practical implementation and advantages of a PR-XNN is to anticipate the behavior and subsequent consequences of an autonomous vehicle including but not limited to autonomous air, land, sea, underwater and space indoor and outdoor vehicles. Using a PR-XNN, an autonomous driverless car, for example, may determine that in one of its anticipated future explanations there is a reference to a child or adult being potentially hit by the driverless car. When the safety control system in the driverless car detects such anticipated references, it may take an appropriate safety related action, such as to switch the car to a safer driving mode, or slow down, or turn on some higher resolution sensor to better resolve the future possibilities prior to them actually happening. PR-XNNs may allow practical systems to safely operate automated machinery based on the anticipation and prediction of consequences. The ability to guarantee a safe mode of operation of machinery and robots, especially machinery and robots which interact with people, is a major unresolved problem which PR-XNNs may solve to a large extent.

Video XNNs (V-XNNs) are a combination of CNN-XNNs and PR-XNNs whereby a sequence of images (frames) are used to predict, anticipate and explain what is likely to happen in future frames. This combination may be common enough to warrant an explicit variant of XNNs to make implementation easier by re-using best practice implementations. Video XNNs are not limited to 2D video. A 3D data stream processed by the CNN-XNN will enable the XNNs to process and explain 3D data such as stereoscopic videos, LIDAR data, RADAR, SONAR, and the like. V-XNNs incorporate a CNN-XNN generally prior to the input for a PR-XNN, thus having the CNN-XNN acting as a pre-processing step for the input to the PR-XNN. The PR-XNN output may also be incorporated in a feedback loop that goes back to the CNN-XNN. Sensor data, such as 2D or 3D video, will generally be fed into the CNN-XNN. It is contemplated that alternative arrangements such as a PR-XNN followed by a CNN-XNN and a subsequent second PR-XNN can also be useful in a practical implementation of a V-XNN. V-XNNs can also be used to process non-video data efficiently, for example, stock price information or time-series data as long as there is a defined sequence and ordering to the input information.

Example applications of V-XNNs would be in medical devices that perform continuous scans of a patient, such as during operations involving fluoroscopy equipment that constantly scans patients with X-Rays while a surgeon is operating. V-XNNs in such a situation may provide quasi-realtime feedback to the surgeon of any diagnosis together with its explanation, which is important especially in a time critical situation like a surgical intervention. Another example application of a V-XNN is during troubleshooting of industrial machinery, where scans are being constantly taken and anomalies need to be detected. Subsequent interventions and troubleshooting steps will force the system to adapt its answers and explanations to new situations, with the resulting explanations making V-XNNs a more suitable solution than other solutions that do not give an explanation.

It may be contemplated that V-XNNs may be combined with other XNN variants like a QA-XNN to implement interactive solutions that need to have situational awareness combined with interventions and actions that affect the physical world, enabling the system to adapt to changing circumstances while all the time maintaining its capability to explain itself. Combining such a system with a PR-XNN also gives it the capability to anticipate the future to some extent, giving it further useful capabilities that are beyond the scope of current black-box neural network-based systems.

Explainable Generative Adversarial Networks (XGANs) extend the XNN architecture concept to Generative Adversarial Networks (GANs) enabling explanations to be generated, processed and be incorporated in the encoding and decoding processes. XGANs utilize XNNs instead of standard neural networks giving rise to explainability for both the generator and the discriminator. An XGAN utilizes an XNN in either the generator or discriminator or in both parts of a GAN system. The advantage of an XGAN over a standard GAN is that the explanation information present in an XNN becomes available in a generative adversarial system, allowing the XGAN to have more complex behavior beyond what a GAN can do. For example, in an XGAN application that tries to detect anomalies efficiently over a telecoms network by generating potential examples of anomalous situations, the explanations can be used by the discriminator to distinguish between true and false alarms more efficiently than in the case when no explanations are available.

A reinforcement learning (RL) training method can utilize XNNs to create an Explainable Reinforcement Learning Model (XRL). The XRL may include the generation of explanations in the action plan and world model components of the RL system. The XRL may use the explanations themselves as part of the cost and reward functions. XRLs can be extended to the entire class of techniques based on agent-environment interactions, for example those that are based on Markov decision processes, game theory and also partially observable Markov decision processes. XRL may use the explanation information as part of the feedback, error, reward, cost, state space, action space, etc. Example applications of XRL would be in robotics, where XRLs may utilize the explanation information to anticipate safety issues and minimize or prevent unsafe operation modes; in vehicle traffic control, XRLs can utilize explanations about the anticipated behavior of vehicles to ensure a better flow and throughput and anticipate potential risks of accidents and bottlenecks more efficiently while also being extensible to a mix of human and autonomous traffic; in resource logistics and planning, XRLs can utilize explanations about the actions of the various agents involved for example in a warehouse to optimize the behavior of autonomous systems such as autonomous forklifts. Explanation information may be critical in such situations to avoid erroneous or potentially illogical actions being taken by such automated systems leading to errors that humans would typically never do, for example by trying to pack a box that has accidentally fallen onto the floor without attempting to pick it up again. An XRL faced with such an explanation would modify the action plan to include a sequence of commands to re-attempt to pick up the box before proceeding with the rest of the plan, altering the cost analysis along the way to accurately reflect the change in the world situation.

Explainable Auto-Encoders (XAE) and Auto-Decoders (XAD) can extend the XNN architecture concept to auto-encoders and auto-decoders. Thus, explanations may be generated, processed and be incorporated in the encoding and decoding processes. An XAE or XAD system may utilize the XNN explanation output as part of its auto-encoding or auto-decoding processing pipeline, giving the system additional capabilities beyond a standard auto encoding (AE) or auto-decoding (AD) system. For example, an XAE system can utilize explanations to do more efficient dimensionality reduction and generalization of an input stream of data by taking the similarity of explanations into account. Other potential XAE/XAD applications are in information retrieval, where explanations can allow better vectorization of database entries for efficient indexing; in anomaly detection, where the explanations are used to better detect an anomalous situation from a non-anomalous situation; and in drug discovery systems, where XAE/XAD based methods will benefit from having an explanation of why a particular drug molecule is predicted to be more efficient than others drug molecules.

Casual XNNs (C-XNNs) extend XNNs to integrate with causal logic models giving the explanations the power of causality. C-XNNs can incorporate casual logic models as part of the prediction network in an XNN. Alternatively, XNNs and/or C-XNNs output may also be incorporated as part of the input in a causal logic model to form another variant of C-XNNs. C-XNNs can also utilize a causal logic model to create explanations that take causality into effect, thus providing an explanation that goes beyond a simple description of a particular scenario, opening up a new range of explanations that give a chain of cause-and-effect scenarios and reasons. C-XNNs are also capable of generating explanations that have a what-if but also a what-if-not nature. For example, a C-XNN can be used to generate a medical diagnosis for a particular condition but also explain the cause-and-effect of that diagnosis. Using the what-if-not capabilities of causal logics the resulting explanations can cover not just what the system has detected but also the reasons for exclusions of other potential symptoms or diagnoses.

It may be contemplated that a C-XNN can be combined with an XRL system to create systems that can anticipate and act in a physical (or simulated) world, explain themselves and also provide automatic input to the XRL simulation system that further improves the performance of the combined system as a whole. For example, a combined C-XNN and XRL system may be used in the previously mentioned warehouse application to detect that a particular type of box keeps falling from a forklift, then using the C-XNN to provide the right parameters to simulate the right amount of pressure increase or decrease or different change in the procedure commands for picking up such particular type of box, and then subsequently using the results of that simulation to update the XRL system. Real world feedback from the next similar case encountered would then lead to further iterative improvements, as happens similarly with humans as they learn from real life experiences. The combination of C-XNNs and XRL allows systems to explain themselves, learn from the explanations and the overlying causal model, and then adapt automatically with minimal or no supervision.

All of the above variants of XNNs remain compatible with the generic XNN architecture, meaning that they can be mixed and matched in various combinations as part of a larger and more sophisticated XNN. For example, a C-XNN can be combined with a CNN-XNN or a V-XNN to provide casual explanations for an autonomous vehicle.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A computer implemented method for converting from a first system comprising at least one of a black-box, grey-box, or white-box neural network to an explainable neural network, comprising executing on a processor the steps of:
    identifying one or more system partitions within the system;
    after identifying the one or more system partitions, wherein the one or more system partitions include one or more overlapping partitions, extracting one or more conditions from the one or more system partitions within the system, wherein extracting the one or more conditions comprises resolving an overlap between the one or more overlapping partitions based on a priority function;
    forming rules from the extracted conditions;
    aggregating the rules into a hierarchy of explainable network partitions comprising a plurality of partitions, said hierarchy comprising a structure in which one or more parent partitions contain one or more child partitions;
    transforming one or more of the conditions;
    combining one or more of the extracted and transformed conditions and identifying one or more coefficients or one or more coefficient weights related to the conditions and explainable network partitions;
    generating linear or non-linear equations from the coefficients, wherein the linear or non-linear equations are local models;
    refining a set of rules produced by the coefficient weights, said set of rules comprising a causal logic model comprising a combination of factual and counterfactual rules; and
    converting, based on a predefined conversion algorithm, an architecture formed from the generated linear or non-linear equations into a logically equivalent explainable neural network architecture having a different one or more of density, sparsity, and structure, said converting step further comprising preserving, in a conversion from the first system to the explainable neural network architecture, all information and all functionality from the first system, said explainable neural network architecture configured to provide, as an output, an explanation including a representation of a plurality of activated explainable neural modules provided simultaneously with an answer without performance loss.

2. The method of claim 1, wherein converting comprises the steps of:
    adding one or more additional features to the system;
    multiplying the additional features by one or more coefficient weights of zero; and
    repeating the step of adding one or more additional features until a prediction network of the explainable neural network is fully connected.

3. The method of claim 1, further comprising implementing the neural network on a GPU.

4. The method of claim 1, wherein the set of rules are defined via a gradient descent technique.

5. The method of claim 1, further comprising deleting one or more rules; pruning the one or more rules; and converting the one or more rules into the coefficients or the coefficient weights.

6. The method of claim 2, wherein the explainable neural network is a dense neural network.

7. The method of claim 2, further comprising obtaining knowledge via a model induction method, and identifying the one or more additional features based on the obtained knowledge.

8. The method of claim 2, further comprising: receiving human knowledge and identifying the one or more additional features based on the human knowledge.

9. The method of claim 8, wherein the human knowledge is represented as a rule in a logic-based format, and wherein converting further comprises directly combining the rule with a plurality of rules formed from the extracted conditions.

10. The method of claim 1, wherein converting comprises the steps of:
    identifying one or more zero-valued coefficients; and
    eliminating the one or more zero-valued coefficients.

11. The method of claim 10, further comprising implementing the explainable neural network on at least one of a CPU, an ASIC, neuromorphic hardware, analog/digital circuitry, a quantum enabled hardware circuit, a handheld device, an autonomous air, land, sea, underwater, or space vehicle system, an automated control system, a robot, or an Internet of Things device.

12. The method of claim 10, further comprising: receiving human knowledge and identifying the one or more zero-valued coefficients based on at least one of the human knowledge and a machine learnt knowledge.

13. The method of claim 10, wherein the system is a dense neural network, and the explainable neural network is a sparse neural network.

14. The method of claim 1, further comprising implementing the explainable neural network directly as a hardware circuit using at least one of:
a flexible programmable gate array,
an application specific integrated circuit,
a neuromorphic computing architecture, and
quantum computing hardware.

15. The method of claim 1, wherein the converting comprises the steps of:
implementing each of the one or more local models in an explainable neural module, wherein each explainable neural module is self-contained; and
aggregating the plurality of explainable neural modules to form a global model;
wherein the plurality of explainable neural modules encompasses the plurality of activated explainable neural modules.

16. The method of claim 15, further comprising training each of the plurality of explainable neural modules independently.

17. The method of claim 15, wherein the plurality of explainable neural modules comprises at least one of a sparse neural network and a dense neural network.

18. A system for providing an explainable neural network, comprising:
a hardware circuit or a computer processor other than a graphics processing unit, wherein the hardware circuit or computer processor is configured to implement a plurality of explainable neural modules, wherein each explainable neural module is configured to interface with another explainable neural module, wherein an output of each of the plurality of explainable neural modules is interpretable by at least one of the plurality of explainable neural modules, and wherein each of the plurality of explainable neural modules comprises a local model;
wherein at least one of the plurality of explainable neural modules comprises a conditional layer configured to model an input based on a partition hierarchy comprising one or more partitions including one or more overlapping partitions, wherein each of the one or more partitions comprises a rule, and wherein said hierarchy comprises a structure in which one or more parent partitions contain one or more child partitions;
wherein the conditional layer is further configured to resolve an overlap between the one or more overlapping partitions based on a priority function; and
wherein the system is configured to provide, as a system output, an explanation including a representation of a plurality of activated explainable neural modules selected from the plurality of explainable neural modules, said plurality of activated explainable neural modules provided simultaneously with an answer without performance loss.

19. The system of claim 18, wherein each of the plurality of explainable neural modules is independently implemented on a hardware resource comprising at least one of a CPU, an ASIC, neuromorphic hardware, analog/digital circuitry, a quantum enabled hardware circuit, a handheld device, an autonomous air, land, sea, underwater, or space vehicle system, an automated control system, a robot, or an Internet of Things device.

20. The system of claim 18, wherein the plurality of explainable neural modules are deployed on quantum processing hardware.

21. The system of claim 18, wherein each of the plurality of explainable neural modules is configurable to a user defined level of precision.

22. The system of claim 18, wherein each of the plurality of explainable neural modules is trained independently.

23. The system of claim 18, wherein the plurality of explainable neural modules comprises at least one of a dense neural network and a sparse neural network.

24. The system of claim 18, wherein at least one of the plurality of explainable neural modules comprises one or more of:
an aggregation layer configured to aggregate one or more rules into one or more of the partitions; and
a switch output layer configured to selectively pool the aggregated partitions from the aggregation layer with the remaining partitions from the conditional layer;
a feature generation and transformation network comprising one or more transformation neurons configured to apply one or more transformations to the input;
a fit layer configured to combine features which have been transformed by the feature generation and transformation network to identify one or more coefficients or one or more coefficient weights related to at least one of: one or more features and one or more partitions; and
a value output layer configured to output a value related to at least one of: one or more features, one or more partitions, as applied to the one or more coefficients; and
an output layer configured to present the output which is interpretable and explainable by at least one of a machine program or a human.

25. The system of claim 24, wherein at least one of the plurality of explainable neural modules forms a conditional network, the conditional network comprising the conditional layer, aggregation layer, and switch output layer.

26. The system of claim 25, wherein the conditional network is one of a sparse neural network and a dense neural network.

27. The system of claim 24, wherein one explainable neural module forms a prediction network, the prediction network comprising the feature generation and transformation network, the fit layer, and the value output layer.

28. The system of claim 27, wherein the prediction network is one of a sparse neural network and a dense neural network.

29. A system for converting from a first system comprising at least one of a black-box, grey-box, or white-box neural network to an explainable neural network, comprising a processor configured to execute the steps of:
identifying one or more system partitions within the system;
after identifying the one or more system partitions, wherein the one or more system partitions include one or more overlapping partitions, extracting one or more conditions from the one or more system partitions within the system, wherein extracting the one or more conditions comprises resolving an overlap between the one or more overlapping partitions based on a priority function;

forming rules from the extracted conditions;

aggregating the rules into a hierarchy of explainable network partitions comprising a plurality of partitions, said hierarchy comprising a structure in which one or more parent partitions contain one or more child partitions;

transforming one or more of the conditions;

combining one or more of the extracted and transformed conditions and identifying one or more coefficients or one or more coefficient weights related to the conditions and explainable network partitions;

generating linear or non-linear equations from the coefficients, wherein the linear or non-linear equations are local models;

refining a set of rules produced by the coefficient weights, said set of rules comprising a causal logic model comprising a combination of factual and counterfactual rules; and converting, based on a predefined conversion algorithm, an architecture formed from the generated linear or non-linear equations into a logically equivalent explainable neural network architecture having a different density.

* * * * *